United States Patent
Xiao et al.

(10) Patent No.: US 9,769,621 B2
(45) Date of Patent: Sep. 19, 2017

(54) POSITIONING METHOD FOR USER EQUIPMENT, DATA SENDING METHOD, DEVICE AND USER EQUIPMENT

(71) Applicant: Huawei Technologies Co., Ltd., Shenzhen, Guangdong (CN)

(72) Inventors: Dengkun Xiao, Shenzhen (CN); Jie Cui, Shenzhen (CN); Anjian Li, Shenzhen (CN); Jiangbo Zhu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 193 days.

(21) Appl. No.: 14/339,042

(22) Filed: Jul. 23, 2014

(65) Prior Publication Data
US 2014/0349582 A1 Nov. 27, 2014

Related U.S. Application Data

(63) Continuation of application No. PCT/CN2012/079375, filed on Jul. 30, 2012.

(51) Int. Cl.
| | |
|---|---|
| *H04B 17/00* | (2015.01) |
| *H04W 4/02* | (2009.01) |
| *H04W 64/00* | (2009.01) |
| *G01S 5/02* | (2010.01) |
| *G01S 5/10* | (2006.01) |

(52) U.S. Cl.
CPC .......... *H04W 4/027* (2013.01); *G01S 5/0236* (2013.01); *G01S 5/10* (2013.01); *H04W 64/00* (2013.01)

(58) Field of Classification Search
CPC ........ G01S 5/0236; G01S 5/10; H04W 4/027; H04W 64/00
(Continued)

(56) References Cited

U.S. PATENT DOCUMENTS

| | | | |
|---|---|---|---|
| 7,940,740 B2 | 5/2011 | Krishnamurthy et al. | |
| 8,744,481 B2 * | 6/2014 | Baldemair | G01S 5/0009 455/456.1 |

| | | | |
|---|---|---|---|
| 2008/0117102 A1 * | 5/2008 | Syrjarinne | G01S 19/05 342/357.42 |

(Continued)

FOREIGN PATENT DOCUMENTS

| | | |
|---|---|---|
| CN | 101272591 A | 9/2008 |
| CN | 102065537 A | 5/2011 |

(Continued)

OTHER PUBLICATIONS

"3GPP TS 36.133—$3^{rd}$ Generation Partnership Project; Technical Specification Group Radio Access Network; Evolved Universal Terrestrial Radio Access (E-UTRA); Requirements for support of radio resource management (Release 11)," Version 11.1.0, $3^{rd}$ Generation Partnership Project, Valbonne, France (Jun. 2012).

"3GPP TS 36.211—$3^{rd}$ Generation Partnership Project; Technical Specification Group Radio Access Network; Evolved Universal Terrestrial Radio Access (E-UTRA); Physical Channels and Modulation (Release 10)," Version 10.5.0, $3^{rd}$ Generation Partnership Project, Valbonne, France (Jun. 2012).

(Continued)

*Primary Examiner* — Ajibola Akinyemi
(74) *Attorney, Agent, or Firm* — Leydig, Voit & Mayer, Ltd.

(57) ABSTRACT

A positioning method for a user equipment, a data sending method, a device and a user equipment are disclosed. After receiving a positioning service trigger, the method comprises: acquiring a velocity estimate of a UE to be positioned; selecting configuration information of a PRS according to the velocity estimate, setting a PRS sending period of an evolved base station eNB, and sending the PRS sending period to the eNB; sending the configuration information of the PRS to the UE, enabling the UE to receive the PRS sent by the eNB according to the configuration of the PRS and estimate a measurement of RSTD; and receiving the measurement of RSTD sent by the UE, and calculating a geographic position of the UE according to the measurement of RSTD. The embodiments of the disclosure improve effectively the accuracy of positioning the user equipment.

33 Claims, 10 Drawing Sheets

(58) Field of Classification Search
USPC .................................................. 455/67.11
See application file for complete search history.

(56) References Cited

U.S. PATENT DOCUMENTS

| | | | |
|---|---|---|---|
| 2010/0317343 A1 | 12/2010 | Krishnamurthy et al. | |
| 2011/0275385 A1 | 11/2011 | Escolar-Piedras et al. | |
| 2013/0190006 A1* | 7/2013 | Kazmi | H04W 64/006 455/456.1 |

FOREIGN PATENT DOCUMENTS

| | | |
|---|---|---|
| CN | 102461292 A | 5/2012 |
| CN | 102641292 A | 5/2012 |
| WO | WO 2010144765 A1 | 12/2010 |
| WO | WO 2011002372 A1 | 1/2011 |

OTHER PUBLICATIONS

"3GPP TS 36.305—$3^{rd}$ Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 11)," Version 11.0.0, $3^{rd}$ Generation Partnership Project, Valbonne, France (Jun. 2012).

"3GPP TS 36.331—$3^{rd}$ Generation Partnership Project; Technical Specification Group Radio Access Network; Evolved Universal Terrestrial Radio Access (E-UTRA); Radio Resource Control (RRC); Protocol specification (Release 11)," Version 11.0.0, $3^{rd}$ Generation Partnership Project, Valbonne, France (Jun. 2012).

"3GPP TS 36.355—$3^{rd}$ Generation Partnership Project; Technical Specification Group Radio Access Network; Evolved Universal Terrestrial Radio Access (E-UTRA); LTE Positioning Protocol (LPP) (Release 10)," Version 10.5.0, $3^{rd}$ Generation Partnership Project, Valbonne, France (Jun. 2012).

"3GPP TS 36.455—$3^{rd}$ Generation Partnership Project; Technical Specification Group Radio Access Network; Evolved Universal Terrestrial Radio Access (E-UTRA); LTE Positioning Protocol A (LPPa) (Release 10)," Version 10.3.0, $3^{rd}$ Generation Partnership Project, Valbonne, France (Jun. 2012).

$1^{st}$ Office Action in corresponding Chinese Patent Application No. 201280027339 (Aug. 1, 2016).

* cited by examiner

POSITIONING METHOD FOR USER EQUIPMENT, DATA SENDING METHOD, DEVICE AND USER EQUIPMENT

CROSS-REFERENCE TO RELATED APPLICATIONS

This application is a continuation of International Patent Application No. PCT/CN2012/079375, filed on Jul. 30, 2012, which is hereby incorporated by reference in its entirety.

FIELD OF TECHNOLOGY

The disclosure relates to the technical field of mobile communication, and in particular to a positioning method for a user equipment, a data sending method, a device, and a user equipment.

BACKGROUND OF THE INVENTION

With development of mobile communication technology, the need for positioning service is gradually increased. Applicable scenarios of the positioning service present a tendency of diversity, such as emergency help positioning, crime tracking and positioning, navigation and traffic control, and so on. However, no matter how diversified the applicable scenarios are, it is always desired to achieve a reliable, efficient and fast positioning to meet demands for positioning in the industry.

Currently, there are many kinds of positioning methods in the mobile communication technology, and in these methods, enhanced cell identification (CID, Cell Identification) positioning, downlink positioning (observed time difference of arrival OTDOA, method of Observed Time Difference of Arrival) or the like is the most common positioning technology.

The CID positioning is a method to represent a geographic position of a mobile station by the ID of a cell in which the mobile station is located. In the mobile positioning, the CID positioning is a positioning method which is most convenient, simplest and easiest to realize, however, the positioning accuracy thereof is low because the positioning accuracy depends on the magnitude of radius of cell, and if the radius of cell is large, the position of the cell to which the mobile station belongs can not accurately reflect the geographic position of the mobile station, resulting in a serious positioning error.

The principle of the OTDOA positioning is as follows: when there are three or more base stations in the system, the position of a terminal can be determined by the time difference of arrival (TDOA: Time Difference of Arrival) of downlink communication signals from the different base stations. That is, an enhanced serving mobile location center (e-SMLC, Enhanced Serving Mobile Location Center) at the network side collects the PRS sending configurations of the base stations and sends the same to the mobile station as assistance data. The base stations send the PRS on downlink, and the mobile station receives the PRS from a plurality of the positioning base stations and recognizes position of the first accessible path of each PRS, so as to obtain the TDOA of the PRS among the different base stations and report the same to the e-SMLC; the e-SMLC receives TDOA of the PRS from the different base stations through the mobile station, which can be mapped into the distance difference between the mobile station and the different base stations. Then, the accurate position of the mobile station can be obtained by e-SMLC through mathematical calculation. However, the accuracy of the OTDOA positioning largely depends on the receipt of the PRS signal and the estimation of the first accessible path. Although the positioning of a terminal can be achieved in some dense urban or some indoor scenarios, since it is required to estimate the TDOA of the signals, the wireless propagation environment of the dense urban and indoor scenarios would affect the multipath of the signals, resulting in that the TDOA can not exactly reflect the linear distance difference from two base stations to the UE, thus the positioning error is increased.

In the process of researching and practicing the prior art, the inventor of the present disclosure found that in the existing implementations, neither the CID positioning nor the OTDOA positioning can effectively improve the positioning accuracy, thus the problem to be solved currently is how to effectively improve the positioning accuracy.

SUMMARY OF THE INVENTION

The embodiment of the disclosure relates to a positioning method for a user equipment, a data sending method, a device and a user equipment, which can effectively improve the positioning accuracy of the user equipment.

To solve the above problem, an embodiment of the disclosure provides a positioning method for a user equipment, after receiving a positioning service trigger, the method comprising:
acquiring a velocity estimate of a user equipment UE to be positioned;
selecting configuration information of a positioning reference signal PRS according to the velocity estimate, setting a PRS sending period of an evolved base station eNB, and sending the PRS sending period to the eNB;
sending the configuration information of the PRS to the UE, enabling the UE to receive the PRS sent by the eNB according to the configuration of the PRS and estimate a measurement of reference signal time difference RSTD; and
receiving the measurement of RSTD sent by the UE, and calculating a geographic position of the UE according to the measurement of RSTD.

An embodiment of the disclosure provides a data sending method, comprising:
sending, when receiving a request for reporting measurement of reference signal time difference RSTD of a positioning reference signal PRS sent by a mobile location center, to the mobile location center a request for assistance data of PRS configuration information, the request comprising a velocity estimate of a UE;
receiving the assistance data sent by the mobile location center, the assistance data comprising the PRS configuration information of an evolved base station eNB;
receiving PRS according to the PRS configuration information of the eNB, and estimating the measurement of reference signal time difference RSTD; and
sending the measurement of RSTD to the mobile location center, enabling the mobile location center to calculate a geographic position of the UE.

An embodiment of the disclosure further provides a positioning method for a user equipment, comprising:
acquiring configuration information of a positioning reference signal PRS of an evolved base station eNB and acquiring a velocity estimate of a user equipment UE;
sending the configuration information of the PRS to the UE, enabling the UE to receive the PRS according to the configuration information of the PRS and estimate a measurement of reference signal time difference RSTD;

receiving the measurement of RSTD sent by the UE; and calculating a geographic position of the UE according to the measurement of RSTD, and performing compensation according to the velocity estimate.

An embodiment of the disclosure further provides a data sending method, comprising:

requesting, when receiving a request sent by a mobile location center for reporting a measurement of reference signal time difference RSTD of a positioning reference signal PRS, the mobile location center for assistance data of configuration information of the PRS;

receiving the assistance data of the PRS sent by the mobile location center, the assistance data comprising the configuration information of the PRS of an evolved base station eNB;

receiving the PRS according to the configuration information of the PRS of the eNB and estimating the measurement of reference signal time difference RSTD; and sending the measurement of RSTD to the mobile location center, enabling the mobile location center to calculate a geographic position of the UE and perform compensation according to the acquired velocity estimate of the UE.

An embodiment of the disclosure further provides a positioning method for a user equipment, comprising:

acquiring configuration information of a positioning reference signal PRS of an evolved base station eNB and acquiring a PRS time difference between different nodes under the eNB;

sending the configuration information of the PRS, an identification of the eNB, identifications of the different nodes, and the PRS time difference between the different nodes, enabling the UE to receive the PRS according to the configuration information of the PRS, perform time domain compensation according to the PRS time difference between the different nodes, and estimate a measurement of reference signal time difference RSTD;

receiving the measurement of RSTD sent by the UE; and calculating a geographic position of the UE according the measurement of RSTD.

An embodiment of the disclosure further provides a data sending method, comprising:

requesting, when receiving a request sent by a mobile location center for reporting a measurement of reference signal time difference RSTD of a positioning reference signal PRS, the mobile location center for assistance data of configuration information of the PRS;

receiving the configuration information of the PRS of an evolved base station eNB sent by the mobile location center, and a PRS time difference between different nodes under the eNB;

receiving the PRS according to the configuration information of the PRS of the eNB, performing time domain compensation according to the PRS time difference between the different nodes, and estimating the measurement of reference signal time difference RSTD; and sending the measurement of RSTD to the mobile location center, enabling the mobile location center to calculate a geographic position of the UE.

Accordingly, an embodiment of the disclosure provides a positioning device for a user equipment, wherein after receiving a the positioning service trigger, the device comprises:

an acquiring unit configured to acquire a velocity estimate of a user equipment UE to be positioned;

a determining unit configured to select configuration information of a positioning reference signal PRS according to the velocity estimate, and set a PRS sending period of an evolved base station eNB;

a first sending unit configured to send the PRS sending period to the eNB;

a second sending unit configured to send the configuration information of the PRS to the UE, enabling the UE to receive the PRS sent by the eNB according to the configuration information of the PRS and estimate a measurement of reference signal time difference RSTD;

a receiving unit configured to receive the measurement of RSTD sent by the UE; and a calculating unit configured to calculate a geographic position of the UE according to the measurement of RSTD.

An embodiment of the disclosure provides a user equipment, comprising:

a first receiving unit configured to receive a request for reporting measurement of reference signal time difference RSTD of a positioning reference signal PRS sent by a mobile location center;

a first sending unit configured to sending to the mobile location center a request for assistance data of PRS configuration information when the first receiving unit receives the request, the request comprising a velocity estimate of the UE;

a second receiving unit configured to receive the assistance data sent by the mobile location center, the assistance data comprising the PRS configuration information of an evolved station eNB;

an estimating unit configured to receive the PRS according to the PRS configuration information of the eNB and estimating the measurement of reference signal time difference RSTD; and a second sending unit configured to send the measurement of RSTD to the mobile location center, enabling the mobile location center to calculate a geographic position of the UE.

An embodiment of the disclosure further provides a positioning device for a user equipment, comprising:

an acquiring unit configured to acquire configuration information of a positioning reference signal PRS of an evolved base station eNB and acquire the velocity estimate of a user equipment UE;

a sending unit configured to send the configuration information of the PRS to the UE, enabling the UE to receive the PRS according to the configuration information of the PRS and estimate a measurement of reference signal time difference RSTD;

a receiving unit configured to receive the measurement of RSTD sent by the UE; and a calculating unit configured to calculate a geographic position of the UE according to the measurement of RSTD and performing compensation according to the velocity estimate.

An embodiment of the disclosure further provides a positioning device for a user equipment, comprising:

an acquiring unit configured to acquire configuration information of a positioning reference signal PRS of an evolved base station eNB and acquire a PRS time difference between different nodes under the eNB;

a sending unit configured to send the configuration information of the PRS, an identification of the eNB, identifications of the different nodes, and the PRS time difference between the different nodes, enabling the UE to receive the PRS according to the configuration information of the PRS, perform time domain compensation according to the PRS time difference between the different nodes, and estimate a measurement of reference signal time difference RSTD;

a receiving unit configured to receive the measurement of RSTD sent by the UE; and a calculating unit configured to calculate a geographic position of the UE according to the measurement of RSTD.

An embodiment of the disclosure also provides a user equipment, comprising:

a first receiving unit configured to receive a request sent by a mobile location center for reporting a measurement of reference signal time difference RSTD of a positioning reference signal PRS;

a first sending unit configured to request the mobile location center for assistance data of configuration information of the PRS when the first receiving unit receives the request;

a second receiving unit configured to receive the configuration information of the PRS of an evolved base station eNB sent by the mobile location center, and a PRS time difference between different nodes under the eNB;

an estimating unit configured to receive the PRS according to the configuration information of the PRS of the eNB, performing time domain compensation according to the PRS time difference between the different nodes, and estimate the measurement of reference signal time difference RSTD; and a second sending unit configured to send the measurement of RSTD to the mobile location center, enabling the mobile location center to calculate a geographic position of the UE.

An embodiment of the disclosure further provides a positioning method for a user equipment, comprising:

sending a request for report of information on small nodes subordinate to an evolved base station eNB to the eNB;

receiving a response of the information on the small nodes subordinate to the eNB reported by the eNB; and determining a geographic position of a user equipment UE according to the information on the small nodes subordinate to the eNB.

An embodiment of the disclosure further provides a positioning device for a user equipment, comprising:

a requesting unit configured to send a request for report of information on small nodes subordinate to an evolved base station eNB to the eNB;

a first receiving unit configured to receive a response of the information on the small nodes subordinate to the eNB reported by the eNB; and a determining unit for determining a geographic position of a user equipment UE according to the information on the small nodes subordinate to the eNB.

According to the above technical solutions, in the embodiments of the disclosure, in a high-velocity environment, a mobile location center, an enhanced serving mobile location center, a location server or the like may select appropriate PRS configuration information according to the actual velocity or velocity level at which a UE is moving, so as to improve the timeness for estimating reference signal time difference RSTD by the UE, thus improving the accuracy for calculating the geographic position of the UE.

BRIEF DESCRIPTION OF THE DRAWINGS

In order to more clearly describe the embodiments of the disclosure or the technical solutions in the prior art, accompanying drawings necessary for describing the embodiments or the prior art would be briefly described below. It is obvious to ordinary ones skilled in the art that these drawings described below are only for some embodiments of the disclosure and other drawings can be obtained from these drawings without any creative effort.

DETAILED DESCRIPTION OF THE EMBODIMENTS

Hereinafter, the technical solutions in the embodiments of the disclosure would be clearly and fully described in connection with the accompanying drawings showing these embodiments. Obviously, the embodiments described are only a part of the embodiments of the disclosure, but not all the embodiments. Based on these embodiments, all other embodiments conceived by ordinary ones skilled in the art without any creative effort would fall within the protection scope of the disclosure.

Figure 1:
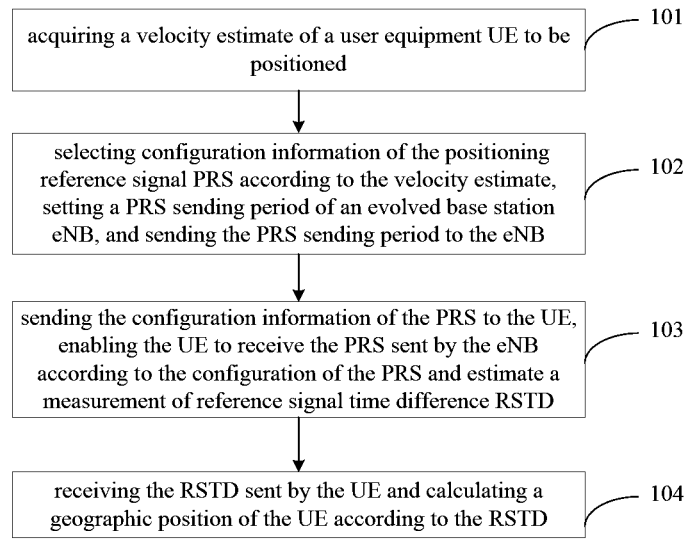
FIG. 1 is a flowchart showing a first positioning method for a user equipment provided by an embodiment of the disclosure.

FIG. 1 is a flowchart showing the first positioning method for a user equipment provided by an embodiment of the disclosure, and after receiving a positioning service trigger the method comprises the processes as follows.

Step 101: acquiring a velocity estimate of a user equipment UE to be positioned.

In this step, there may be two ways for acquiring the velocity estimate of the UE as follows.

One way is to obtain the velocity estimate of the UE from a request received from the UE for assistance data of the PRS. Specifically, when the positioning service trigger is received, a mobile location center, an enhanced serving mobile location center or a location server may request the UE to report the measurement of RSTD of the PRS through long-term evolution positioning protocol LPP (LTE positioning protocol) signaling; and receive the request for the assistance data of the configuration information of the PRS through the LPP signaling which is sent by the UE after receiving the request for the measurement of RSTD of the PRS. The LPP signaling includes the velocity estimate of the UE.

The other way is that the mobile location center, the enhanced serving mobile location center or the location server may request an eNB to report the velocity estimate of the UE to be positioned. Specifically, when the positioning service trigger is received, the mobile location center, the enhanced serving mobile location center or the location server may request long-term evolution positioning protocol LPP signaling when receiving the positioning service trigger, receive a request for the assistance data of the PRS through the LPP signaling which is sent by the UE after receiving the request for the measurement of RSTD of the PRS; request the eNB to report the velocity estimate of the UE through a long-term evolution positioning protocol LPPa signaling, and receive an LPPa signaling response sent by the eNB, the LPPa signaling response including an identification for the UE to be positioned and the velocity estimate of the UE.

The velocity estimate may be an exact velocity value, and may be a velocity level, such as divided into three levels of high, medium and low.

The process of obtaining the velocity estimate of the UE according to this embodiment would not be limited to using LPP signaling, other types of signaling with similar function could also be used. Accordingly, this embodiment of the disclosure is not limited thereto.

In this embodiment, the positioning service may be triggered by an eNB, or a UE, or an MME (Mobile Management Entity, mobile management entity), or other network entities. If the positioning service is triggered by the eNB, the eNB will send a request for positioning service to the MME, and this request is transparently transmitted or forwarded to the mobile location center, the enhanced serving mobile location center or the location server by the MME. When the mobile location center, the enhanced serving mobile location center or the location server calculates the position of the UE, the position information will be returned to the MME, and then the MME will transparently transmit or forward this position information to the eNB. The positioning processes triggered by the UE, the MME or the other network entities are well known to ones skilled in the art, and thus the description thereof is omitted herein.

Step 102, selecting configuration information of the positioning reference signal PRS according to the velocity estimate, setting a PRS sending period of an evolved base station eNB, and sending the PRS sending period to the eNB.

In this step, appropriate configuration information of the PRS may be selected according to a magnitude of the velocity estimate of the UE. It is noted that the configuration information of the PRS corresponding to the magnitude of the velocity estimate of the UE is stored in the mobile location center, the enhanced serving mobile location center or the location server in advance. The mobile location center, the enhanced serving mobile location center or the location server may also adaptively configure the corresponding configuration information of the PRS according to the magnitude of the velocity of the UE. This embodiment should not be limited thereto.

Afterward, the PRS sending period of an evolved base station (eNB) is set according to the configuration information of the PRS, and the set PRS sending period is sent to the eNB, so that the eNB sends the PRS at the PRS sending period.

Step 103: sending the configuration information of the PRS to the UE, enabling the UE to receive the PRS sent by the eNB according to the configuration of the PRS and estimate a measurement of reference signal time difference RSTD.

In this step, the mobile location center, the enhanced serving mobile location center, the location server or the like, after having sent the set PRS sending period to the eNB, sends the configuration information of the PRS to the UE, so that the UE receives the PRS sent by the eNB according to the configuration of the PRS, and then estimates reference signal time difference (RSTD). The detailed process of estimating and measuring RSTD is well known to ones skilled in the art, and thus the description thereof is omitted herein.

Step 104: receiving the RSTD sent by the UE and calculating a geographic position of the UE according to the RSTD.

In this step, the process of calculating the geographic position of the UE according to the RSTD is well known to ones skilled in the art and thus is omitted herein.

In the embodiments of the disclosure, in a high-velocity environment, the mobile location center, the enhanced serving mobile location center, the location server or the like may select appropriate PRS configuration information according to the actual velocity or velocity level at which a UE is moving, so as to improve the timeness for estimating reference signal time difference RSTD by the UE, thus improving the accuracy for calculating the geographic position of the UE.

Figure 2:
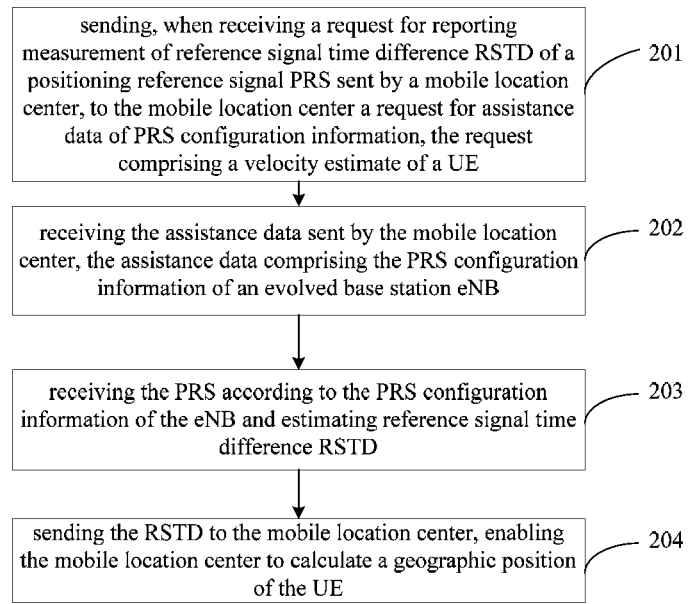
FIG. 2 is a flowchart showing a first data sending method provided by an embodiment of the disclosure.

Refer to FIG. 2 which is a flowchart showing the first data sending method provided by an embodiment of the disclosure, and the method comprises the processes as follows.

Step 201: sending, when receiving a request for reporting measurement of reference signal time difference RSTD of a positioning reference signal PRS sent by a mobile location center, to the mobile location center a request for assistance data of PRS configuration information, the request comprising a velocity estimate of a UE.

The PRS configuration information may include a sending timing, a sending sequence and the like of the PRS. However, in the signaling of the request, if the velocity estimate of a UE is included, the mobile location center receiving the signaling will perform an additional process. For example, the mobile location center will select appropriate PRS configuration information and the like according to the magnitude of the velocity estimate of the UE. If the velocity estimate of the UE is not included in the signaling, the mobile location center receiving the signaling will not perform an additional process, as will be described in detail later and not be described herein.

Step 202: receiving the assistance data sent by the mobile location center, the assistance data comprising the PRS configuration information of an evolved base station eNB.

The PRS configuration information of the eNB is the PRS configuration information re-selected by the mobile location center according to the magnitude of the velocity estimate of the UE.

Step 203: receiving the PRS according to the PRS configuration information of the eNB and estimating reference signal time difference RSTD.

The process of estimating reference signal time difference RSTD according to the received PRS is well known to ones skilled in the art and thus is omitted herein.

Step 204: sending the RSTD to the mobile location center, enabling the mobile location center to calculate a geographic position of the UE.

This embodiment of the disclosure is not limited to the mobile location center, but could be an enhanced serving mobile location center, a location server or the like.

In the embodiments of the disclosure, when the UE receives the request for reporting the measurement of the time difference RSTD of the PRS from the mobile location center, the UE may report its own current velocity estimate to the mobile location center, so that mobile location center selects appropriate PRS configuration information. After receiving the PRS configuration information, reference signal time difference RSTD can be accurately estimated, so that the mobile location center can calculate the geographic position of the UE according to the accurate RSTD.

Figure 3:
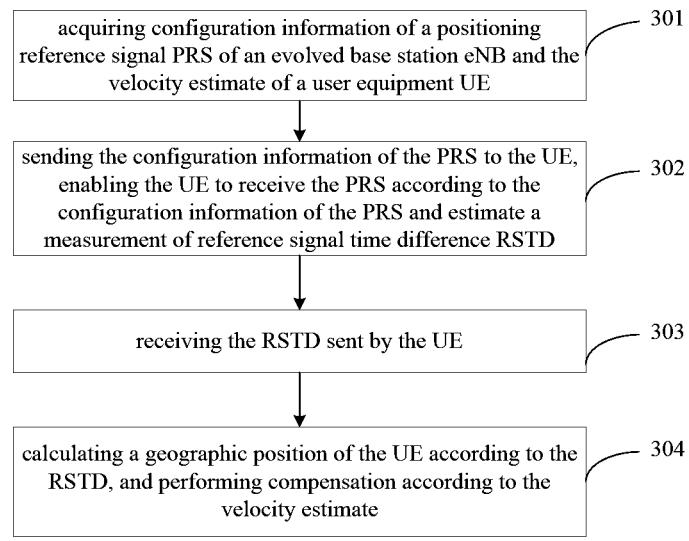
FIG. 3 is a flowchart showing a second positioning method for a user equipment provided by an embodiment of the disclosure.

Refer to FIG. 3 which is a flowchart showing the second positioning method for a user equipment provided by an embodiment of the disclosure, and the method comprises the processes as follows.

Step 301: acquiring configuration information of a positioning reference signal PRS of an evolved base station eNB and the velocity estimate of a user equipment UE.

In this step, the acquiring process is as follows: a mobile location center, an enhanced serving mobile location center, a location server or the like may request the eNB to report a velocity estimate of the UE, an identification of the UE and configuration information of the PRS through LTE positioning protocol LPPa signaling; and receive an LPPa signaling response sent by the eNB, wherein the LPPa signaling response may include the identification of the UE to be positioned, the velocity estimate of the UE to be positioned and the configuration information of the PRS.

In this embodiment, the identification of the UE, the velocity estimate of the UE to be positioned and the configuration information of the PRS may be acquired through one or more LPPa signaling(s), and this embodiment should not be limited thereto.

Of course, as for the acquiring process, the two acquiring ways as described in the above embodiments could also be used.

Step 302: sending the configuration information of the PRS to the UE, enabling the UE to receive the PRS according to the configuration information of the PRS and estimate a measurement of reference signal time difference RSTD.

Step 303: receiving the RSTD sent by the UE.

Step 304: calculating a geographic position of the UE according to the RSTD, and performing compensation according to the velocity estimate.

In this embodiment, it is unnecessary to re-select the configuration information of the PRS by the eSMLC with respect to the velocity estimate, and the current static configuration information of the PRS could still be used, that is, the sending mode in the configuration information of the PRS is configured by an OAM without being dynamically configured by the eSMLC. Therefore, the eSMLC will only perform post-compensation through the velocity amount reported by the UE or eNB.

Figure 4:
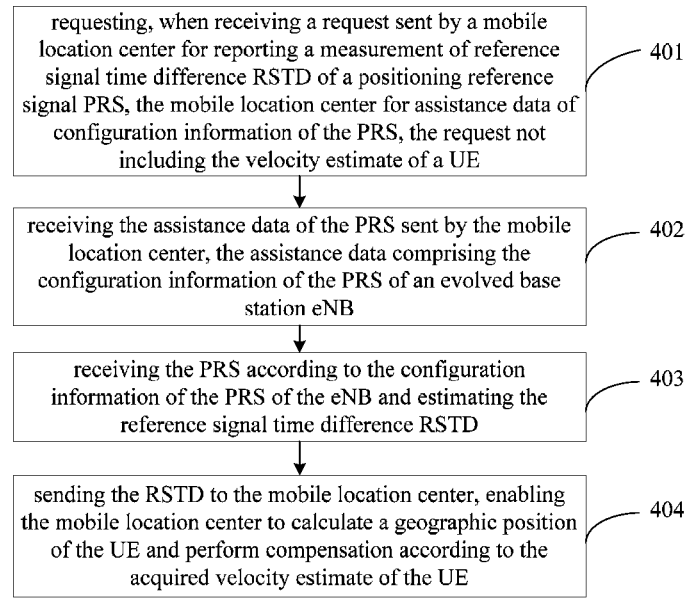
FIG. 4 is a flowchart showing a second data sending method provided by an embodiment of the disclosure.

Refer to FIG. 4 which is a flowchart showing the second data sending method provided by an embodiment of the disclosure, and the method comprises the processes as follows.

Step 401: requesting, when receiving a request sent by a mobile location center for reporting a measurement of reference signal time difference RSTD of a positioning reference signal PRS, the mobile location center for assistance data of configuration information of the PRS. That is, if the request does not carry the velocity estimate of a UE, the process would be same as the related art.

Step 402: receiving the assistance data of the PRS sent by the mobile location center, the assistance data comprising the configuration information of the PRS of an evolved base station eNB.

Step 403: receiving the PRS according to the configuration information of the PRS of the eNB and estimating the reference signal time difference RSTD.

Step 404: sending the RSTD to the mobile location center, enabling the mobile location center to calculate a geographic position of the UE and perform compensation according to the acquired velocity estimate of the UE.

Accordingly, this embodiment of the disclosure also provides a flowchart showing another data sending method, and the method comprises: receiving a request sent by the mobile location center for acquiring the configuration information of the PRS, the identification of the UE and the velocity estimate of the UE; sending a response including the configuration information of the PRS, the identification of the UE and the velocity estimate of the UE to the mobile location center.

The request may be an LTE positioning protocol LPPa signaling request, and the response may be an LTE positioning protocol LPPa signaling response. Of course, other similar requests or responses could also be used, and this embodiment should not be limited thereto.

Figure 5:
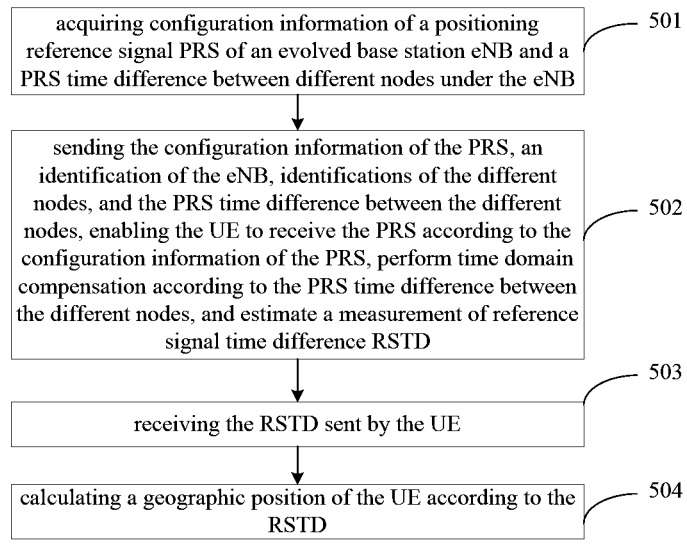
FIG. 5 is a flowchart showing a third positioning method for a user equipment provided by an embodiment of the disclosure.

Refer to FIG. 5 which is a flowchart showing the third positioning method for a user equipment provided by an embodiment of the disclosure, and the method comprises the processes as follows.

Step 501: acquiring configuration information of a positioning reference signal PRS of an evolved base station eNB and a PRS time difference between different nodes under the eNB.

In this step, the acquiring mode may be as follows: the eNB is requested to report the PRS time difference between the different nodes, the identifications of the different nodes and the configuration information of the PRS through LTE positioning protocol LPPa signaling; and an LPPa signaling response sent by the eNB is received, wherein the LPPa signaling response includes the PRS time difference between the different nodes, the identifications of the different nodes and the configuration information of the PRS.

The PRS time difference between the different nodes includes the PRS sending time difference among multiple different component carriers CC, or the PRS time difference among multiple different coordinated multi-point transmission CoMP nodes. The time difference may be an exact time difference or level, etc.

Step 502: sending the configuration information of the PRS, an identification of the eNB, identifications of the different nodes, and the PRS time difference between the different nodes, enabling the UE to receive the PRS according to the configuration information of the PRS, perform time domain compensation according to the PRS time difference between the different nodes, and estimate a measurement of reference signal time difference RSTD.

Step 503: receiving the RSTD sent by the UE.

Step 504: calculating a geographic position of the UE according to the RSTD.

Figure 6:
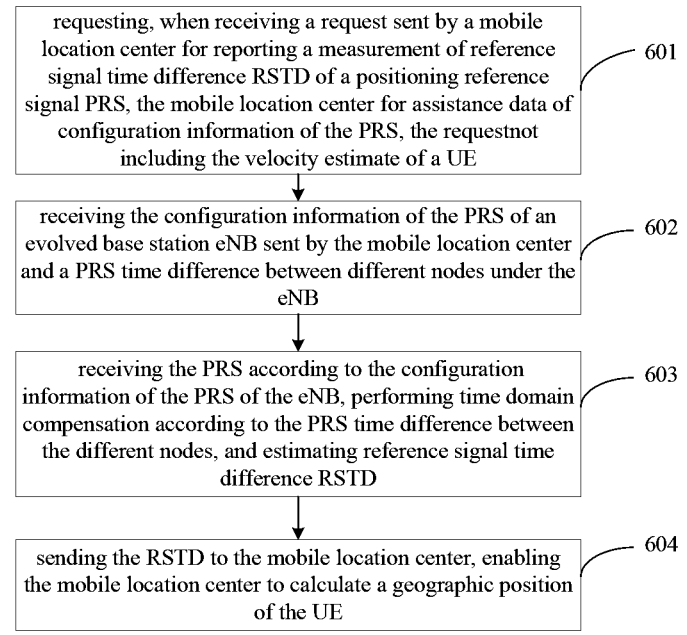
FIG. 6 is a flowchart showing a third data sending method provided by an embodiment of the disclosure.

Refer to FIG. 6 which is a flowchart showing the third data sending method provided by an embodiment of the disclosure, and the method comprises the processes as follows.

Step 601: requesting, when receiving a request sent by a mobile location center for reporting a measurement of reference signal time difference RSTD of a positioning reference signal PRS, the mobile location center for assistance data of configuration information of the PRS. That is, if the request does not include the velocity estimate of a UE, the process would be same as the related art.

Step 602: receiving the configuration information of the PRS of an evolved base station eNB sent by the mobile location center and a PRS time difference between different nodes under the eNB.

Specifically, the PRS configuration information of the evolved base station eNB sent by the mobile location center and the PRS time difference between different nodes in the eNB are received through LTE positioning protocol LPPa signaling, wherein the LPPa signaling includes the identification of the eNB and the identifications of the different nodes; and the PRS time difference between the different nodes includes the PRS sending time difference among multiple different component carriers CC, or the PRS time difference among multiple different coordinated multi-point transmission CoMP nodes under the eNB.

Step 603: receiving the PRS according to the configuration information of the PRS of the eNB, performing time domain compensation according to the PRS time difference between the different nodes, and estimating reference signal time difference RSTD.

Step 604: sending the RSTD to the mobile location center, enabling the mobile location center to calculate a geographic position of the UE.

Figure 7:
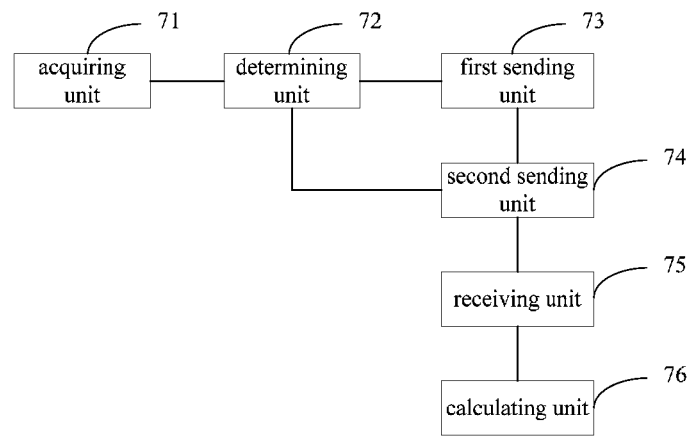
FIG. 7 is a schematic view showing a first structure of a positioning device for a user equipment provided by an embodiment of the disclosure.

An embodiment of the disclosure further provides a positioning device for a user equipment based on the implementation process of the above method, and the schematic view of the first structure of the positioning device is shown in FIG. 7. After receiving a the positioning service trigger, the device comprises an acquiring unit 71, a determining unit 72, a first sending unit 73, a second sending unit 74, a receiving unit 75 and a calculating unit 76.

The acquiring unit 71 is configured to acquire a velocity estimate of a user equipment UE to be positioned; the determining unit 72 is configured to select configuration information of a positioning reference signal PRS according to the velocity estimate, and set a PRS sending period of an evolved base station eNB; the first sending unit 73 is configured to send the PRS sending period to the eNB; the second sending unit 74 is configured to send the configuration information of the PRS to the UE when or after the first sending unit 73 sends the PRS sending period to the eNB, enabling the UE to receive the PRS sent by the eNB according to the configuration information of the PRS and estimate a measurement of reference signal time difference RSTD; the receiving unit 75 is configured to receive the RSTD sent by the UE; and the calculating unit 76 is configured to calculate a geographic position of the UE according to the RSTD.

Alternatively, the acquiring unit includes a first acquiring unit and/or a second acquiring unit.

The first acquiring unit is configured to obtain the velocity estimate of the UE from a request received from the UE for assistance data of the PRS. The first acquiring unit specifically comprises a first requesting unit and a first obtaining unit, wherein the first requesting unit is configured to request the UE to report the measurement of RSTD of the PRS through a long-term evolution positioning protocol LPP signaling when receiving the positioning service trigger; and the first obtaining unit is configured to receive the request for the assistance data of the configuration information of the PRS through the LPP signaling which is sent by the UE after receiving the request for the measurement of RSTD of the PRS, the LPP signaling comprising the velocity estimate of the UE.

The second acquiring unit is configured to request the eNB to report the velocity estimate for positioning the UE. The second acquiring unit specifically comprises a second requesting unit, a second obtaining unit, a third requesting unit and a third obtaining unit, wherein the second requesting unit is configured to request the user equipment UE to report the measurement of RSTD of the PRS through the a long-term evolution positioning protocol LPP signaling when receiving the positioning service trigger; the second obtaining unit is configured to receive a request for the assistance data of the PRS through the LPP signaling which is sent by the UE after receiving the request for the measurement of RSTD of the PRS, and the LPP signaling does not include the velocity estimate of the UE; the third requesting unit is configured to request the eNB to report the velocity estimate of the UE through a long-term evolution positioning protocol LPPa signaling; and the third obtaining unit is configured to receive an LPPa signaling response sent by the eNB, the LPPa signaling response comprising an identification for the UE to be positioned and the velocity estimate of the UE.

Figure 8:
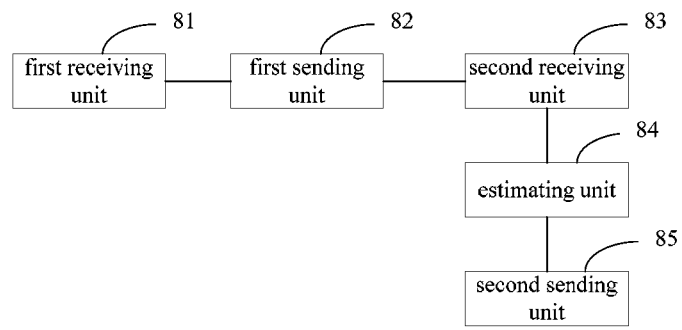
FIG. 8 is a schematic view showing a first structure of a user equipment provided by an embodiment of the disclosure.

Refer to FIG. 8 which is a schematic view showing the first structure of a user equipment provided by an embodiment of the disclosure. The user equipment comprises a first receiving unit 81, a first sending unit 82, a second receiving unit 83, an estimating unit 84 and a second sending unit 85, wherein the first receiving unit 81 is configured to receive a request for reporting measurement of reference signal time difference RSTD of a positioning reference signal PRS sent by a mobile location center; the first sending unit 82 is configured to sending to the mobile location center a request for assistance data of PRS configuration information when the first receiving unit receives the request, the request including a velocity estimate of the UE; the second receiving unit 83 is configured to receive the assistance data sent by the mobile location center, the assistance data comprising the PRS configuration information of an evolved station eNB; the estimating unit 84 is configured to receive the PRS according to the PRS configuration information of the eNB and estimating the measurement of reference signal time difference RSTD; and the second sending unit 85 is configured to send the measurement of RSTD to the mobile location center, enabling the mobile location center to calculate a geographic position of the UE.

In this embodiment of the disclosure, when the first sending unit requests the mobile location center for the assistance data of the PRS configuration information, the request includes the velocity estimate of the UE, so that the mobile location center, after receiving the velocity estimate of the UE, selects or configures the PRS configuration information according to the velocity estimate, thus improving the accuracy for subsequent calculation of the geographic position of the UE.

Figure 9:
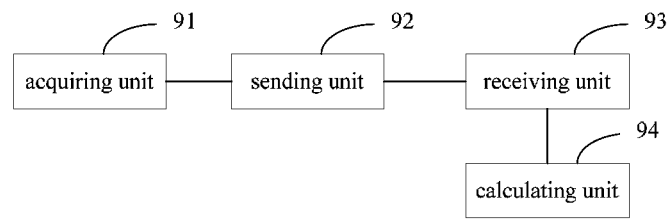
FIG. 9 is a schematic view showing a second structure of a positioning device for a user equipment provided by an embodiment of the disclosure.

Refer to FIG. 9 which is a schematic view showing the second structure of a positioning device for a user equipment provided by an embodiment of the disclosure. The device includes an acquiring unit 91, a sending unit 92, a receiving unit 93 and a calculating unit 94, wherein the acquiring unit 91 is configured to acquire configuration information of a positioning reference signal PRS of an evolved base station eNB, and a velocity estimate of a user equipment UE; the sending unit 92 is configured to send the configuration information of the PRS to the UE, enabling the UE to receive the PRS according to the configuration information of the PRS and estimate a reference signal time difference RSTD; the receiving unit 93 is configured to receive the RSTD sent by the UE; and the calculating unit 94 is configured to calculate a geographic position of the UE according to the measurement of RSTD and performing compensation according to the velocity estimate.

Alternatively, the acquiring unit includes a requesting unit and an obtaining unit, wherein the requesting unit is configured to request the eNB to report the velocity estimate of the UE, an identification of the UE and the configuration information of the PRS through a long-term evolution positioning protocol LPPa signaling; the obtaining unit is configured to receive an LPPa signaling response sent by the eNB, the LPPa signaling comprising the identification of the UE, the velocity estimate of the UE and the configuration information of the PRS. The identification of the UE to be positioned, the velocity estimate of the UE to be positioned and the configuration information of the PRS can be acquired through one or more LPPa signaling(s), and this embodiment should not be limited thereto.

In addition, an embodiment of the disclosure provides a user equipment. The user equipment includes a first receiving unit, a first sending unit, a second receiving unit, an estimating unit and a second sending unit, wherein the first receiving unit is configured to receive a request sent by a mobile location center for reporting a measurement of reference signal time difference RSTD of a positioning reference signal PRS; the first sending unit is configured to request the mobile location center for assistance data of configuration information of the PRS when the first receiving unit receives the request, and the request does not include the velocity estimate of the UE; the second receiving unit is configured to receive the assistant data of the PRS sent by the mobile location center, and the assistant data includes the configuration information of the PRS of an evolved base station eNB; the estimating unit is configured to receive the PRS according to the configuration information of the PRS of the eNB and estimate the reference signal time difference RSTD; and the second sending unit is configured to send the RSTD to the mobile location center, so that the mobile location center calculates a geographic position of the UE and performs compensation according to the acquired velocity estimate of the UE.

The user equipment in this embodiment is different from the user equipment shown in FIG. 8 in that when the first sending unit requests the mobile location center for the assistance data of the PRS configuration information, the request does not include the velocity estimate of the UE, but after the mobile location center has received the request without the velocity estimate of the UE, it is necessary to still use the current static configuration information of the PRS, that is, the PRS configuration information configured by OAM is acquired from eNB, and the velocity estimate of the UE also needs to be acquired at the same time, so that in the process of subsequent calculation of the geographic position of the UE, compensation is made according to the velocity estimate of the UE, and thus the accuracy of positioning is improved.

In addition, an embodiment of the disclosure also provides a positioning device for a user equipment, and the device includes an acquiring unit, a sending unit, a receiving unit and a calculating unit.

The acquiring unit is configured to acquire configuration information of a positioning reference signal PRS of an evolved base station eNB and a PRS time difference between different nodes under the eNB; the sending unit is configured to send the configuration information of the PRS, an identification of the eNB, identifications of the different nodes, and the PRS time difference between the different nodes, enabling the UE to receive the PRS according to the configuration information of the PRS, perform time domain compensation according to the PRS time difference between the different nodes, and estimate a measurement of reference signal time difference RSTD; the receiving unit is configured to receive the RSTD sent by the UE; and the calculating unit is configured to calculate a geographic position of the UE according to the RSTD.

Alternatively, the acquiring unit includes a requesting unit and an obtaining unit, wherein the requesting unit is configured to request the eNB to report the PRS time difference between all the different nodes, the identifications of the different nodes and the PRS configuration information through a long-term evolution positioning protocol LPPa signaling; and the obtaining unit is configured to receive an LPPa signaling response sent by the eNB, the LPPa signaling response comprising the PRS time difference between all the different nodes, the identifications of the different nodes and the configuration information of the PRS. The PRS time difference between the different nodes specifically includes the PRS sending time difference among multiple different component carriers CC, or the PRS time difference among multiple different coordinated multi-point transmission CoMP nodes.

In addition, an embodiment of the disclosure further provides a user equipment. The user equipment includes a first receiving unit, a first sending unit, a second receiving unit, an estimating unit and a second sending unit, wherein the first receiving unit is configured to receive a request sent by a mobile location center for reporting a measurement of reference signal time difference RSTD of a positioning reference signal PRS; the first sending unit is configured to request the mobile location center for assistance data of configuration information of the PRS when the first receiving unit receives the request; the second receiving unit is configured to receive the configuration information of the PRS of an evolved base station eNB sent by the mobile location center and a PRS time difference between different nodes under the eNB; the estimating unit is configured to receive the PRS according to the configuration information of the PRS of the eNB, performing time domain compensation according to the PRS time difference between the different nodes, and estimate the measurement of reference signal time difference RSTD; and the second sending unit is configured to send the measurement of RSTD to the mobile location center, enabling the mobile location center to calculate a geographic position of the UE.

Alternatively, the second receiving unit may receive the configuration information of the PRS and the PRS time difference between all the different nodes under the eNB sent by the mobile location center through a long-term evolution positioning protocol LPPa signaling. The LPPa signaling further includes an identification of the eNB and identifications of the different nodes. The PRS time difference between the different nodes includes the PRS sending time difference among multiple different component carriers CC, or the PRS time difference among multiple different coordinated multi-point transmission CoMP nodes under the eNB.

In order to facilitate ones skilled in the art to understand the disclosure, the disclosure will be described by way of the specific applicable examples, and the embodiment will be described in the high-velocity environment and small-bandwidth environment, respectively.

Embodiment 1

Figure 10:
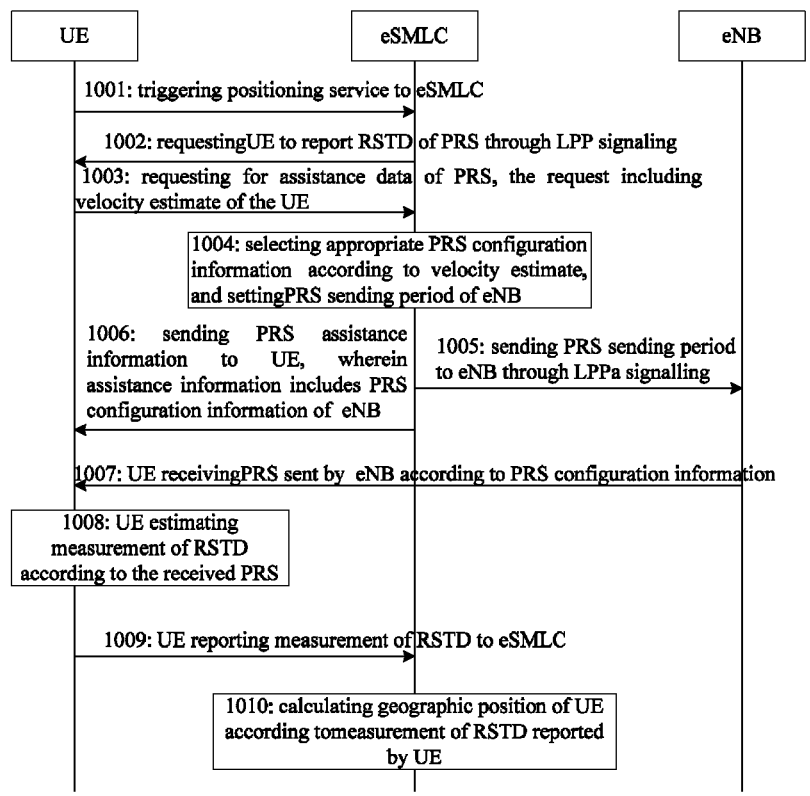
FIG. 10 is a flowchart showing a first application example of a positioning method for a user equipment provided by an embodiment of the disclosure.

In embodiment 1, taking two kinds of high-velocity environments as example, in the current OTDOA positioning system, the PRS sending period is configured by the core network OAM (operation administration and maintenance entity) during network planning, and is basically a static configuration. However, in the high-velocity environment, it is obviously unreasonable if a UE moving at a high velocity is configured with a PRS having a long period. Therefore, in this embodiment, it is necessary for a mobile location center (such as a location server) to re-configure by selecting an appropriate PRS period according to the actual velocity or velocity level of the UE. The PRS is sent by an eNB, that is to say, e-SMLC needs to configure the PRS sending period of the eNB according to the velocity of the UE. Refer to FIG. 10 which is a flowchart showing the first application example of a positioning method for a user equipment provided by an embodiment of the disclosure. This embodiment takes the high-velocity environment as example, and in this embodiment, the velocity estimate is reported by a UE, wherein eSMLC is taken as an example of a mobile location center. The specific implementing flow includes the processes as follows.

Step 1001: triggering a positioning service to eSMLC.

The triggering source has no limitation, and the triggering of positioning service could be performed by an eNB, or a UE, or an MME (Mobile Management Entity, mobile management entity), or other network entities. If the positioning service is triggered by the eNB, the eNB will send a request for positioning service to the MME, and the MME will transparently transmit or forward this request to the mobile location center, the enhanced serving mobile location center or the location server. When the mobile location center, the enhanced serving mobile location center or the location server has calculated the position of the UE, the position information will be sent back to the MME, and then the MME will transparently transmit or forward this position information to the eNB. The positioning process in the case of being triggered by the UE, MME or other network entities is well known to ones skilled in the art and thus will not be described in detail. The embodiment will be described by taking triggering by UE as example.

Step 1002: the eSMLC, after receiving the triggering of positioning service, requesting the UE to report the measurement for positioning, i.e. RSTD of the PRS, through a long-term evolution positioning protocol LPP signaling.

Step 1003: the UE, after receiving the request for reporting the measurement of RSTD from the eSMLC, requesting the eSMLC for assistance data of the PRS, wherein the request includes the velocity estimate of the UE.

The assistance data is representative of the configuration of the PRS, e.g. a sending timing, a sending sequence and the like of the PRS, which has been defined in the present standard. However, the present standard does not include the velocity estimate of the UE per se in the signaling by which the UE requests the assistance data (it is an optional function, if the velocity is not included, the e-SMLC will not carry out an additional process; and if the velocity estimate is included, the e-SMLC will configure the PRS appropriately according to the magnitude of the velocity estimate). The signaling for transmitting the velocity estimate of the UE may be an LPP signaling, and the format of the signaling, for example, may be as follows, but should not be limited thereto:
OTDOA-RequestAssistanceData;
where OTDOA-RequestAssistanceData is used by the UE to request the e-SMLC for the assistance data, and the newly added signaling in the embodiment is shown by the italic portion.

```
-- ASN1START
OTDOA-RequestAssistanceData ::= SEQUENCE {
    physCellId      INTEGER (0..503),
    ueVelocity      UeVelocity,
    ...
}
-- ASN1STOP
``` where physCellId represents a physical cell ID of a belonged cell reported by the UE. The italic portion is the velocity estimate reported by the UE. It is noted there is no limitation on the signaling form, and the above example is only one form. The reported velocity estimate can be an exact velocity value, and also can be a velocity level (such as high, medium or low), and the disclosure should not be limited thereto. It is well known to ones skilled in the art to estimate or obtain the velocity, and thus will not be described in detail herein.

Step 1004: the eSMLC receiving the request for the assistance data reported by the UE, selecting appropriate configuration information (e.g. sending period, etc.) for PRS according to the velocity estimate in the request, and setting the PRS sending period of the eNB.

The correspondence between the velocity estimate and the selection of the PRS configuration information depends on the implementing algorithm in the eSMLC. If the algorithm is different, the selection way would be also different, and the disclosure should not be limited thereto. For example, if the velocity estimated value is larger than 30 km/h, the PRS sending period would be configured as 160 ms.

Step 1005: the eSMLC sending the PRS sending period to the eNB through LPPa (LTE positioning protocol A, for interaction between the eNB and the eSMLC), and the eNB sending the PRS according to the PRS sending period.

Step 1006: the eSMLC sending the PRS assistance information to the UE, wherein the assistance information includes the PRS configuration information of the eNB.

Step 1005 and step 1006 may be carried out simultaneously; and the embodiment should not be limited thereto.

Step 1007: the UE receiving the PRS sent by the eNB according to the PRS configuration information in the PRS assistance information.

Step 1008: the UE estimating the measurement of RSTD according to the received PRS.

Step 1009: the UE reporting the measurement of RSTD to the eSMLC.

Step 1010: the eSMLC calculating a geographic position of the UE according to the measurement of RSTD reported by the UE.

Figure 11:
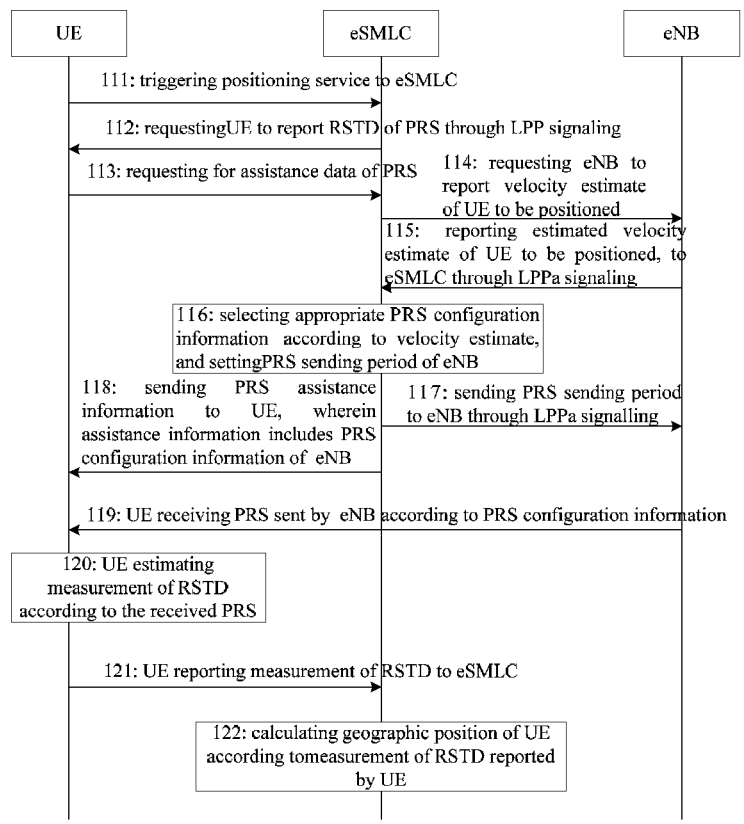
FIG. 11 is a flowchart showing a second application example of a positioning method for a user equipment provided by an embodiment of the disclosure.

Refer to FIG. 11 which is a flowchart showing the second application example of a positioning method for a user equipment provided by an embodiment of the disclosure. This embodiment is also exemplified by high-velocity environment. In this embodiment, the velocity estimate is reported through the eNB, wherein the mobile location center is exemplified by eSMLC, and the specific implementing flow includes the processes as follows.

Step 111: triggering the positioning service to the eSMLC.

The triggering source may be triggered when the UE itself needs to be positioned, or may be triggered when the network needs to position the UE, and the embodiment should not be limited thereto.

Step 112: the eSMLC, after receiving the triggering of the positioning service, requesting the UE to report the measurement of positioning (i.e. RSTD of the PRS) through LPP signaling.

Step 113: the UE, after receiving the request for reporting the measurement of RSTD, requesting the eSMLC for the assistance data of the PRS configuration information. The assistance data is representative of the PRS configuration information, e.g. the sending timing, sending sequence and the like of the PRS. The request does not include the velocity estimate of the UE.

Step 114: the eSMLC requesting eNB to report the velocity estimate of the UE to be positioned.

The request may be transmitted through an LPPa signaling. There is no limitation on the form of the signaling, as long as the content of the signaling contains the identification of the UE to be positioned (for informing the eNB of the velocity of which UE needs to be reported) and the velocity estimate.

Step 115: the eNB reporting the estimated velocity estimate of the UE to be positioned, to the eSMLC through an LPPa signaling.

In the embodiment, reporting the velocity estimate will not be limited to that through the LPPa signaling, and other signalings can also be used, without limitation in the embodiment. There is no limitation on the form of the signaling, as long as the content of the signaling contains the identification of the UE to be positioned (for informing the eSMLC of the velocity of which UE needs to be reported) and the velocity estimate.

The velocity estimate to be reported may be an exact velocity value, or may be a velocity level (high, medium or low, or the like), without limitation in the disclosure.

Step 116: the eSMLC receiving the velocity estimate of the UE reported by the eNB, selecting the appropriate PRS configuration information (e.g., sending period, etc.), and setting the PRS sending period of the eNB according to the PRS configuration information.

The correspondence between the velocity amount and the selection of the PRS configuration depends on the implementing algorithm in the eSMLC, without limitation in the disclosure. For example, a PRS sending period of 160 ms is configured with respect to a velocity larger than 30 km/h.

Step 117: the eSMLC sending the PRS sending period to the eNB through LPPa (LTE positioning protocol A, for interaction between the eNB and the eSMLC); and the eNB setting the PRS sending according to the PRS sending period, and sending the PRS.

Step 118: the eSMLC sending the PRS assistance information to the UE, and the assistance information includes the PRS configuration information of the eNB.

The step 117 and the step 118 may be carried out simultaneously, without limitation in the embodiment.

Step 119: the UE receiving the PRS according to the PRS configuration information in the PRS assistant information.

Step 120: the UE estimating the measurement of RSTD according to the PRS.

Step 121: the UE reporting the estimated measurement of RSTD to the e-SMLC.

Step 122: the eSMLC calculating the geographic position of the UE according to the measurement of RSTD reported by the UE.

Figure 12:
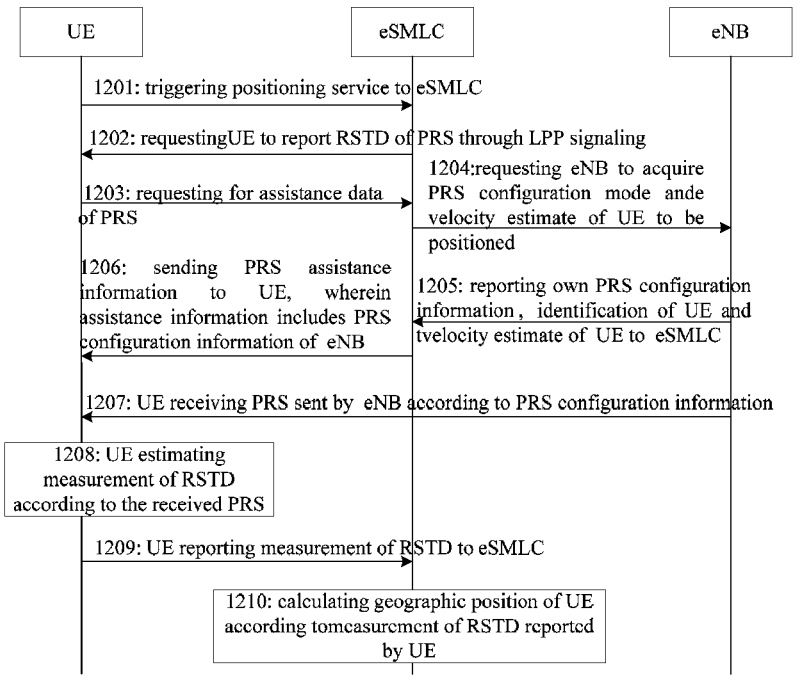
FIG. 12 is a flowchart showing a third application example of a positioning method for a user equipment provided by an embodiment of the disclosure.

Refer to FIG. 12 which is a flowchart showing the third application example of a positioning method for a user equipment provided by an embodiment of the disclosure. This embodiment is still exemplified by high-velocity environment. In this embodiment, the velocity estimate is reported through the eNB, wherein the mobile location center is exemplified by the eSMLC. In this embodiment, the e-SMLC will not change the PRS sending period, and will make compensation according to the measurement reported by the UE. That is to say, in this embodiment, it is unnecessary to enhance the eSMLC, and the current static PRS configuration information can be still used. That is, the PRS sending mode is configured by the OAM, and does not need to be dynamically configured by the eSMLC. In this embodiment, reporting the velocity estimate by the UE and reporting the measurement of RSTD by the UE can be achieved at the same time, that is, can be achieved in a single LPP signaling, and thus do not need to be enhanced. Reporting the measurement of RSTD and reporting the velocity amount at the same time can be supported by the current standard, but sending the velocity estimate of the UE at the same time of sending the static configuration information of the PRS by the eNB is not supported by the current standard. The specific process includes:

Step 1201: triggering the positioning service to the eSMLC.

The triggering source may be triggered when the UE itself needs to be positioned, or also may be triggered when the network needs to position the UE, and there is no limitation in the embodiment.

Step 1202: the eSMLC, after receiving the triggering of the positioning service, requesting the UE to report the measurement of positioning (RSTD of the PRS) through LPP (LTE positioning protocol) signaling.

Step 1203: the UE, after receiving the request from the eSMLC for reporting the measurement of RSTD, requesting the eSMLC for the assistance data of the PRS configuration information. The assistance data is representative of the PRS configuration information, e.g. the sending timing, sending sequence and the like of the PRS, which is defined in the current standard.

Step 1204: the eSMLC, after receiving the request for providing the PRS configuration information from the UE, requesting the eNB to acquire the PRS configuration mode and the velocity estimate of the UE to be positioned.

In this step, the PRS configuration mode is the PRS configuration mode configured by the Operation Administration Maintenance (OAM, Operation Administration Maintenance), i.e. static PRS configuration information.

Meantime, the eSMLC requests the eNB to report the velocity estimate of the UE to be positioned. The request may be transmitted through LPPa signaling, and there is no limitation on the form of the signaling, as long as the content of the signaling contains the identification of the UE to be positioned (for inform the eNB the velocity estimate of which UE needs to be reported) and the velocity estimate. It is noted that the request for the velocity estimate and the request for the PRS configuration information can be achieved in a single LPPa signaling, and also can be achieved through different LPPa signalings, without limitation in the embodiment.

Step 1205: the eNB reporting its own PRS configuration information as well as the identification of the UE and the velocity estimate of the UE to the eSMLC according to the request of the eSMLC.

In this embodiment, the eNB may report the velocity estimate of the UE to be positioned and the PRS configuration information to the eSMLC through LPPa signaling. There is no limitation on the form of the signaling, as long as the content of the signaling contains the identification of the UE to be positioned (for informing the eNB the velocity estimate of which UE needs to be reported) and the velocity estimate.

The reported velocity estimate could be an exact velocity value, or a velocity level (high, medium or low, or the like), without limitation in the disclosure. It is noted that reporting the velocity estimate and reporting the PRS configuration information can be achieved in a single signaling, and can also be achieved in separate signalings, without limitation in the embodiment.

Step 1206: the eSMLC sending the PRS assistance information to the UE, wherein the assistance information includes the PRS configuration information of the eNB.

Step 1207: the UE receiving the PRS according to the PRS configuration information in the PRS assistant information.

Step 1208: the UE estimating the measurement of RSTD according to the PRS.

Step 1209: the UE reporting the measurement of RSTD to the e-SMLC.

Step 1210: the eSMLC calculating the geographic position of the UE according to the measurement of RSTD reported by the UE, and meantime, making compensation on the geographic position of the UE according to the velocity estimate reported by the eNB.

There is no limitation on the compensation method. For the sake of clarity, a compensation method will be described hereinafter, but the disclosure should not be limited thereto.

Of course, there is still another situation, where the UE reports the velocity, but the location server will not re-configure the PRS sending period of the eNB. The static PRS configuration information is directly sent, and the eSMLC will make post-compensation. Other process would be similar to that in the above embodiment, and will not be described redantently.

Figure 13:
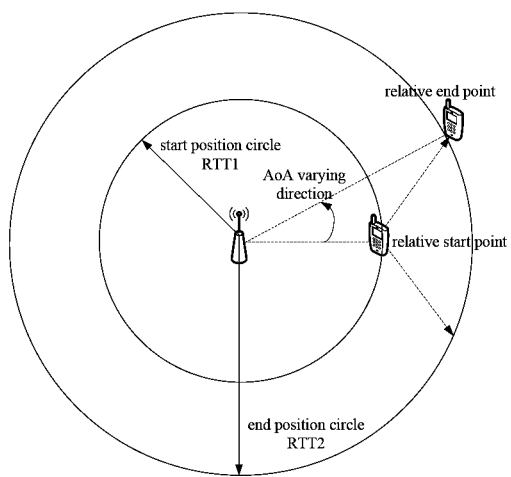
FIG. 13 is a schematic view showing how to calculate the compensation for the geographic position of a user equipment provided by an embodiment of the disclosure.

Refer to FIG. 13 which is a schematic view showing how to calculate the compensation for the geographic position of a user equipment UE provided by an embodiment of the disclosure. As shown, when the UE starts OTDOA positioning, it can be triggered at the network side to carry out eCID positioning once at the same time. When the UE reports the measurement of RSTD, the eCID positioning is also simultaneously triggered once. The eCID positioning can obtain the information about the round trip time (RTT, round trip time, i.e. the liner distance between the UE and the eNB*2/ light velocity) of the UE and the angle of arrival (AoA, Angle of Arrival). As shown in FIG. 13, the RTT at the start point and the end point of the RSTD measurement can be obtained through two eCID positionings, thus the start point and the end point can be determined at two circles, respectively. The distance from the start point to the end point of the UE can be obtained by multiplying the time delay of the RSTD measurement by the light velocity, and then a triangle can be determined because the AoA variation between the start point and the end point is known, as shown by the dashed line in FIG. 13. Therefore, the relative position of the UE with respect to the start point can be known, and thus the compensation can be done when the geographic position of the UE is finally determined.

Embodiment 2

The example is a small-bandwidth environment, and there are two solutions corresponding to the small-bandwidth scenario.

One solution is to make compensation by the CA feature of a terminal, because the RSTD accuracy of the small bandwidth defined in the current standard can not satisfy the actual positioning requirement. Thus, through aggregation of a plurality of CCs of the UE, frequency domain points of the PRS signal at the receiving terminal can be increased, so that the accuracy is ensured.

Another solution is aggregation in frequency domain, by increasing the number of the sub-frames in time domain, the accuracy for measuring the RSTD can be improved and thus the positioning accuracy can be improved.

The embodiment is described in detail as follows.

Figure 14:
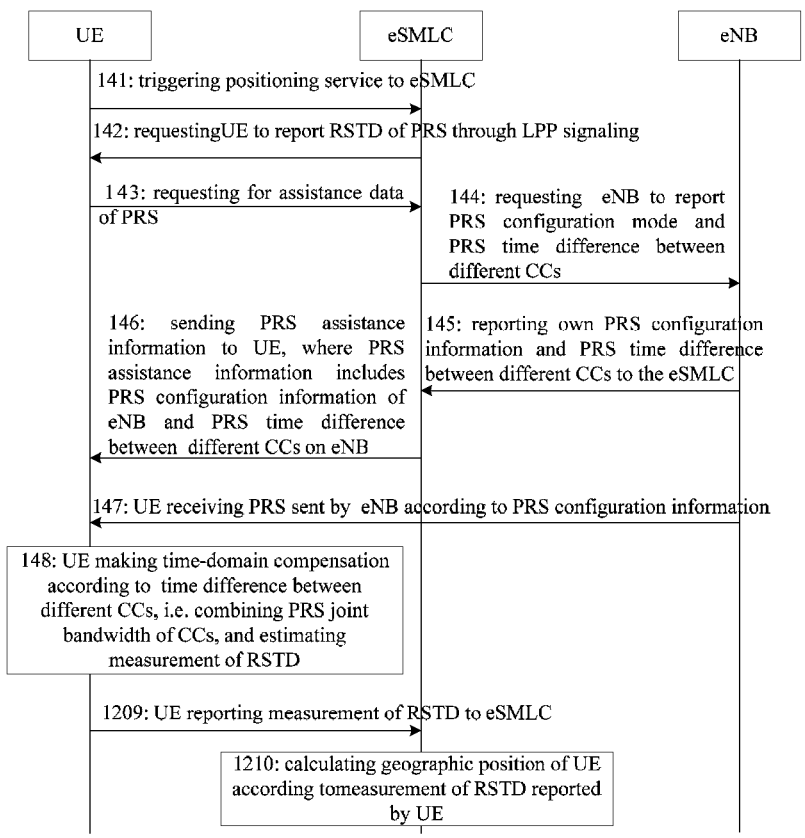
FIG. 14 is a flowchart showing a fourth application example of a positioning method for a user equipment provided by an embodiment of the disclosure.

Refer to FIG. 14 which is a flowchart showing the fourth application example of a positioning method for a user equipment provided by an embodiment of the disclosure. In this embodiment, the compensation is done by utilizing the CA feature, and in particular, includes the processes as follows.

Step 141: triggering the positioning service to the eSMLC.

The triggering source may be triggered when the UE itself needs to be positioned, or may be triggered when the network needs to position the UE, and there is no limitation in the embodiment.

Step 142: the eSMLC, after receiving the triggering of the positioning service, requesting the UE to report the measurement of positioning (RSTD of the PRS) through LPP (LTE positioning protocol) signaling.

Step 143: the UE, after receiving the request for reporting the measurement of RSTD, requesting the eSMLC for the assistance data of the PRS where the assistance data is representative of the configuration of the PRS, such as the sending timing, sending sequence and the like, which has been defined in the current standard.

Step 144: the eSMLC, after receiving the request for providing the configuration of the PRS, requesting the eNB to report the PRS configuration mode and the PRS time difference between different component carriers (CC, component carrier).

The PRS configuration mode is the PRS configuration mode configured by the OAM.

The eSMLC requests the eNB to report the PRS time difference amount between all the different CCs. The request is transmitted through LPPa signaling, and the signaling must contain the identification of CC (for informing the eNB of which CC the time difference is to be reported) and the PRS time difference of the different component carriers. The request for the PRS time difference of the different component carriers and the request for the PRS configuration can be achieved in a single LPPa signaling, or in separate LPPa signalings, and there is no limitation in the embodiment.

Step 145: the eNB reporting its own PRS configuration information and the PRS time difference between all the different CCs to the eSMLC as requested by the eSMLC.

The PRS time difference between all the different CCs to be estimated by the eNB may be reported to the eSMLC through LPPa signaling. But the content of the signaling must contain the identifications of CCs (for informing the eSMLC of between which two CCs the time difference is reported) and the PRS time difference. There is no limitation on the form of the time difference, it can be an exact time difference, and also can be a level (high, medium or low, or the like), without limitation in the disclosure. It is to be noted that reporting the PRS time difference between all the different CC and reporting the PRS configuration information can be achieved in a single LPPa signaling, and also can be achieved in separate LPPa signalings, and there is no limitation in the embodiment.

Step 146: the eSMLC sending the PRS assistance information to the UE, where the PRS assistance information includes the PRS configuration information of the eNB and the PRS time difference between all the different CCs.

The step can inform the UE through LPP signaling, but the content of the signaling must contain the identification of the eNB, the identifications of the CCs (for informing the UE of between which two CCs the time difference amount is and to which eNB the two CCs belong) and the PRS time difference amount between all the different CCs. The time difference could be an exact time difference value, and also could be a level (high, medium, or low, or the like), and there is no limitation in the disclosure. It is to be noted that sending the time difference and sending the PRS configuration information may be achieved in a single LPP signaling, and also may be achieved in separate LPP signalings, and there is no limitation in the embodiment.

Step 147: the UE receiving the PRS according to the PRS assistance information.

Step 148: the UE making time-domain compensation according to the time difference between all the different CCs, i.e. combining the PRS joint bandwidth of all the different CCs, and estimating the measurement of RSTD.

One of time domain compensation modes in this step is to align the PRS signals from the different CCs in the time domain, ensuring that the starting position of every signal is consistent, and then overlap to process. But it is not limited thereto, and other compensation modes can be used, and there is no limitation in the embodiment.

Step 149: the UE reporting the measurement of RSTD to the e-SMLC.

Step 1410: the eSMLC calculating the geographic position of the UE according to the RSTD measurement reported by the UE.

In another embodiment, the compensation can be made by using time domain aggregation. Larger number of PRS sub-frames is configured to the e-SMLC or a core network, that is to say, this mode would be more intuitive, and it is only necessary to configure more PRS sub-frames for the small-bandwidth system. Only six continuous PRS sub-frames are supported by the current standard. Therefore, the signaling of the configuration is modified as follows.

For example, LPP (described in 3GPP TS36.355 protocol):

```
-- ASN1START
PRS-Info ::= SEQUENCE {
    prs-Bandwidth       ENUMERATED { n6, n15, n25, n50, n75, n100, ... },
    prs-ConfigurationIndex INTEGER (0..4095),
    numDL-Frames        ENUMERATED {sf-1, sf-2, sf-4, sf-6,sf-x ...},
    ...,
    prs-MutingInfo-r9           CHOICE {
        po2-r9                  BIT STRING (SIZE(2)),
        po4-r9                  BIT STRING (SIZE(4)),
        po8-r9                  BIT STRING (SIZE(8)),
        po16-r9                 BIT STRING (SIZE(16)),
        ...
    }                           OPTIONAL        --
Need OP
}
-- ASN1STOP
```

The italic portion is newly added signaling definition, and x is a value larger than 6 and indicates that more than six PRS sub-frames can be configured.

As another example, LPPa (described in 3GPP TS36.455 protocol), referring to table 1:

| IE/Group Name | Presence | Range | IE type and reference | Semantics description |
|---|---|---|---|---|
| OTDOA Cell Information | | 1 ... <maxnoOTDOAtypes> | | |
| >CHOICE OTDOA Cell Information Item | M | | | |
| >>PCI | M | | INTEGER (0 ... 503, ... ) | Physical Cell ID |
| >>Cell ID | M | | ECGI 9.2.6 | |
| >>TAC | M | | OCTET STRING (2) | Tracking Area Code |
| >>EARFCN | M | | INTEGER (0 ... 65535, ... ) | Corresponds to $N_{DL}$ for FDD and $N_{DL/UL}$ for TDD in ref. TS 36.104 [5] |
| >>PRS Bandwidth | M | | ENUMERATED (bw6, bw15, bw25, bw50, bw75, bw100, ... ) | Transmission bandwidth of PRS |

| IE/Group Name | Presence | Range | IE type and reference | Semantics description |
|---|---|---|---|---|
| >>PRS Configuration Index | M | | INTEGER (0 ... 4095, ...) | PRS Configuration Index, ref TS 36.211 [6] |
| >>CP Length | M | | ENUMERATED (Normal, Extended, ...) | Cyclic prefix length of the PRS |
| >>Number of DL Frames | M | | ENUMERATED (sf1, sf2, sf4, sf6, sfx, ...) | Number of consecutive downlink subframes $N_{PRS}$ with PRS, ref TS 36.211 [6] |
| >>Number of Antenna Ports | M | | ENUMERATED (n1-or-n2, n4, ...) | Number of used antenna ports, where n1-or-n2 corresponds to 1 or 2 ports, n4 corresponds to 4 ports |
| >>SFN Initialisation Time | M | | BIT STRING (64) | Time in seconds relative to 00:00:00 on 1 January 1900 where binary encoding of the integer part is in the first 32 bits and binary encoding of the fraction part in the last 32 bits. The fraction part is expressed with a granularity of 1/2**32 second. |
| >>E-UTRAN Access Point Position | M | | 9.2.8 | The configured estimated geographical position of the antenna of the cell. |
| >>PRS Muting Configuration | M | | 9.2.9 | The configuration of positioning reference signals muting pattern, when applicable |

In the above table 1, the italic portion is newly added signaling definition, x is a value larger than 6 and indicates that more than six PRS sub-frames can be configured.

Figure 15:
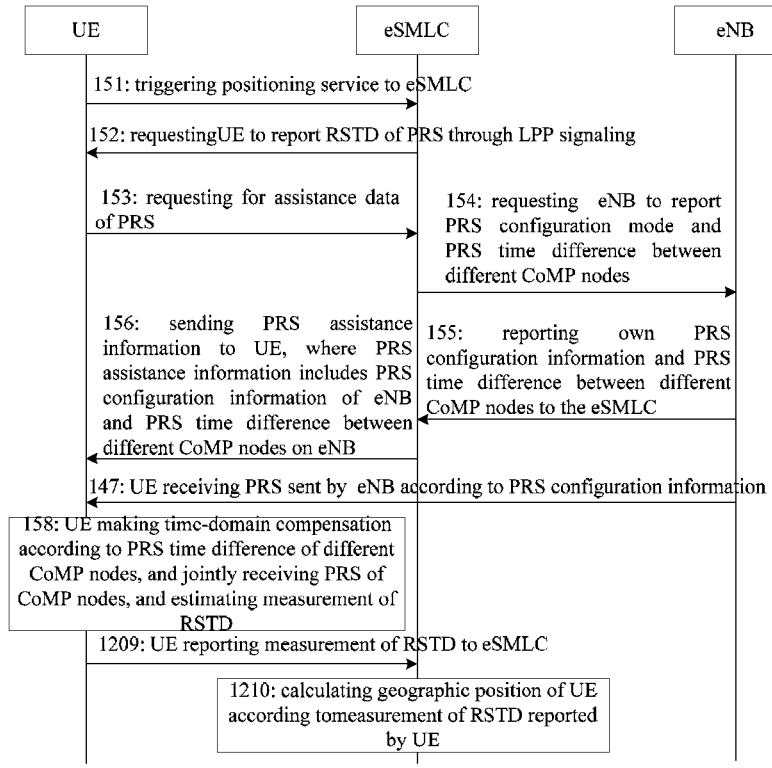
FIG. 15 is a flowchart showing a fifth application example of a positioning method for a user equipment provided by an embodiment of the disclosure.

Refer to FIG. 15 which is a flowchart showing the fifth application example of a positioning method for a user equipment provided by an embodiment of the disclosure. In this embodiment, signals are combined by using a coordinated multi-point-transmission and reception (CoMP, Coordinated multi-point-transmission and reception) mode. For the network of CoMP and the UE supporting the CoMP, the demodulation performance of the PRS can be enhanced by combining multi-point signals. The method, in particular, includes the processes as follows.

Step 151: triggering the positioning service to the eSMLC.

Step 152: the eSMLC, after receiving the triggering of the positioning service, requesting the UE to report the measurement (RSTD of the PRS) of positioning through LPP signaling.

Step 153: the UE, after receiving the request for reporting the measurement of RSTD from the eSMLC, requesting the eSMLC for the assistance data of the PRS.

Step 154: the eSMLC, after receiving the request for providing the configuration of the PRS, enquiring the eNB about the PRS configuration mode configured by the OAM and the PRS time difference of all the different CoMP nodes.

The eSMLC requests the eNB to report the PRS time difference of its all different CoMP nodes. The request can be transmitted through LPPa signaling, but the content of the signaling must contain the identifications of the CoMP nodes (for informing the eNB of between which two CoMP nodes the time difference value is to be reported) and the PRS time difference. It is to be noted that the request for the time difference and the request for the PRS configuration can be achieved in a single LPPa signaling, or in separate signalings, and there is no limitation in the embodiment.

Step 155: the eNB reporting its own PRS configuration information and the PRS time difference between all the different CoMP nodes to the eSMLC as requested by the eSMLC.

The eNB reports the PRS time difference between all the different CoMP nodes as estimated to the eSMLC. There is no limitation on the form of the signaling, but the content of the signaling must contain the identifications of the CoMP nodes (for informing the eSMLC of between which to CoMP nodes the time difference is reported) and the PRS time difference. The time difference to be reported may be an exact time difference value, or may be a level (high, medium or low, or the like), and there is no limitation in the disclosure. It is to be noted that reporting the time difference and reporting the PRS configuration information can be achieved in a single signaling, or separately achieved, and there is no limitation in the embodiment.

Step 156: the eSMLC sending the PRS assistance information to the UE, where the assistance information includes the PRS configuration information of the eNB; and meantime, the PRS time difference between all the different CoMP nodes on the eNB being also sent to the UE.

Sending the PRS time difference between all the different CoMP nodes on the eNB may be informing the UE through LPP signaling. There is no limitation on the form of the signaling, but the content of the signaling must contain the identifications of the eNB and the CoMP nodes (for informing the UE of between which two CoMP nodes the time difference is reported and to which eNB the two CoMP nodes belong) and the PRS time difference. The time difference can be same as the above. It is to be noted that reporting the time difference and reporting the PRS configuration information can be achieved in a single signaling, or separately achieved, and there is no limitation in the embodiment.

Step 157: the UE receiving the PRS according to the PRS assistance information.

Step 158: the UE making time-domain compensation according to the PRS time difference of all the different CoMP nodes, and jointly receiving the PRS of all the different CoMP nodes (the receiving mode and compensation mode have no limitation), and estimating the measurement of RSTD.

One of the time domain compensations in this step is to align all the PRS signals from different CoMP nodes in the time domain, ensuring that the starting position of every signal is consistant, and then overlap to process. But the disclosure should not be limited thereto, and it can be implemented by other time domain compensation methods.

Step 159: the UE reporting the measurement of RSTD to the e-SMLC.

Step 1510: the eSMLC calculating the geographic position of the UE according to the measurement of RSTD reported by the UE.

Embodiment 3

This embodiment is to determine the geographic position of the UE in a hybrid network environment.

Figure 16:
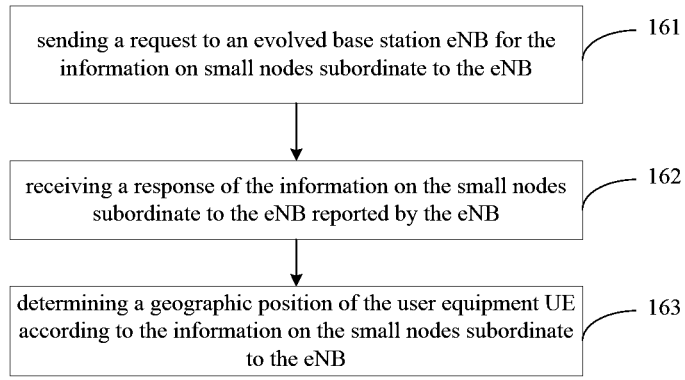
FIG. 16 is a flowchart showing a fourth positioning method for a user equipment provided by an embodiment of the disclosure.

Refer to FIG. 16 which is a flowchart showing the fourth positioning method for a user equipment provided by an embodiment of the disclosure. The method includes the processes as follows.

Step 161: sending a request to an evolved base station eNB for information on small nodes subordinate to the eNB.

The step may be performed by a mobile location center, or a location server. The information on the small nodes subordinate to the eNB may include the indices of the small nodes under the eNB and the position of the small node corresponding to every index. The disclosure should not be limited thereto.

Step 162: receiving a response of the information on the small nodes subordinate to the eNB reported by the eNB.

Alternatively, if the above step 161 includes request for report of the configuration information of the PRS, the response further includes the configuration information of the PRS.

Step 163: determining a geographic position of the user equipment UE according to the information on the small nodes subordinate to the eNB.

That is to say, after the mobile location center has obtained the information on the small nodes subordinate to the eNB, from the information of the small nodes subordinate to the eNB, it can be known in which small node the UE is currently located, thus obtaining the position of the UE.

Furthermore, if the determined position of the UE is not very accurate, the eNB may further be requested for obtaining the configuration information of the PRS, and the obtaining method could be that the information on the small nodes subordinate to the eNB and the configuration information of the PRS may be requested at the same time, or may be acquired separately, and there is no limitation in the embodiment.

Accordingly, the response may further include the information on the small nodes subordinate to the eNB and the configuration information of the PRS at the same time; or the information on the small nodes subordinate to the eNB and the configuration information of the PRS may also be carried by different responses, and there is no limitation in the embodiment.

The information on the small nodes subordinate to the eNB includes the indices of the small nodes under the eNB and the position of the small node corresponding to every index.

Alternatively, based on the above embodiment, after receiving the PRS configuration information reported by the eNB, the method may further include
sending assistance data to the UE wherein the assistance data includes the PRS configuration information, so that the UE estimates the positioning measurement according to the PRS configuration information and of course, in this step, the information on the subordinate small nodes reported by the eNB and the PRS configuration information may be included at the same time; receiving the positioning measurement sent by the UE; and calculating the geographic position of the UE according to the positioning measurement.

In the above embodiment, in the hybrid environment where there are a plurality of RRHs, or PICOs, or Femtos or the like under a certain eNB, it is necessary to report the positions of these small nodes (or hybrid small nodes) to the mobile location center (e.g. location server or eSMLC, etc.) for positioning the UE under the hybrid small nodes. There are mainly three kinds of environments for hybrid small nodes.

The first environment: the small nodes subordinate to the eNB are located in a high building in the vertical dimension, and these nodes can be connected to the eNB wiredly or wirelessly.

The second environment: the small nodes subordinate to the eNB are located in an area in the horizontal dimension, and these nodes can be connected to the eNB wiredly or wirelessly.

The third environment: the small nodes subordinate to the eNB are distributed in both the area in the horizontal dimension and the high building in the vertical dimension, and these nodes can be connected to the eNB wiredly or wirelessly.

When the eSMLC interacts with the eNB, the eNB needs to inform the positions of the nodes subordinate thereto and the indices thereof to the eSMLC. The protection signaling is shown as bold italic portion below (3GPP TS36.455). There is no limitation on the form of the signaling, but the content thereof must contain the indices of the small nodes and the position information of the corresponding node.

For example, refer to table 2 for details on OTDOA Cell information. This IE contains OTDOA information of a cell.

| IE/Group Name | Presence | Range | IE type and reference | Semantics description |
|---|---|---|---|---|
| OTDOA Cell Information | | 1 ... <maxnoOTDOAtypes> | | |
| >CHOICE OTDOA Cell Information Item | M | | | |
| >>PCI | M | | INTEGER (0 ... 503, ... ) | Physical Cell ID |
| >>Cell ID | M | | ECGI 9.2.6 | |
| >>TAC | M | | OCTET STRING (2) | Tracking Area Code |
| >>EARFCN | M | | INTEGER (0 ... 65535, ... ) | Corresponds to $N_{DL}$ for FDD and $N_{DL/UL}$ for TDD in ref. TS 36.104 [5] |
| >>PRS Bandwidth | M | | ENUMERATED (bw6, bw15, bw25, bw50, bw75, bw100, ... ) | Transmission bandwidth of PRS |
| >>PRS Configuration Index | M | | INTEGER (0 ... 4095, ... ) | PRS Configuration Index, ref TS 36.211 [6] |
| >>CP Length | M | | ENUMERATED (Normal, Extended, ... ) | Cyclic prefix length of the PRS |
| >>Number of DL Frames | M | | ENUMERATED (sf1, sf2, sf4, sf6, ... ) | Number of consecutive downlink subframes $N_{PRS}$ with PRS, ref TS 36.211 [6] |
| >>Number of Antenna Ports | M | | ENUMERATED (n1-or-n2, n4, ... ) | Number of used antenna ports, where n1-or-n2 corresponds to 1 or 2 ports, n4 corresponds to 4 ports |
| >>SFN Initialisation Time | M | | BIT STRING (64) | Time in seconds relative to 00:00:00 on 1 January 1900 where binary encoding of the integer part is in the first 32 bits and binary encoding of the fraction part in the last 32 bits. The fraction part is expressed with a granularity of 1/2**32 second. |
| >>E-UTRAN Access Point Position | M | | 9.2.8 | The configured estimated geographical position of the antenna of the cell. |

-continued

| IE/Group Name | Presence | Range | IE type and reference | Semantics description |
|---|---|---|---|---|
| >>PRS Muting Configuration | M | | 9.2.9 | The configuration of positioning reference signals muting pattern, when applicable |
| >>LPN List | O | 1 ... <LPNnumber> | | LPN list includes one or more LPN nodes, LPNnumber represents the number of LPN (may be a limited maximum number, or without limitation) |
| >>LPN index | O | | | Index of LPN under this eNB |
| >>>LPN location | O | | | The LPN position information corresponding to the index of LPN (may be a two-dimensional coordinate, or a three-dimensional coordinate) |

In the above table 2, the bold italic portion is the newly added signaling definition. The low power node (LPN, Low Power Node) can be a pico, a femto, or a radio remote head (RRH, radio remote head), or the like.

```
OTDOACell-Information ::= SEQUENCE (SIZE
(1..maxnoOTDOAtypes))
OF OTDOACell-Information-Item
OTDOACell-Information-Item ::= CHOICE {
    pCI                   PCI,
    cellId                ECGI,
    tAC                   TAC,
    eARFCN                EARFCN,
    pRS-Bandwidth         PRS-Bandwidth,
    pRS-ConfigurationIndex    PRS-Configuration-Index,
    cPLength              CPLength,
    numberOfDlFrames      NumberOfDlFrames,
    numberOfAntennaPorts  NumberOfAntennaPorts,
    sFNInitialisationTime SFNInitialisationTime,
    e-UTRANAccessPointPosition E-UTRANAccessPointPosition,
    lPN-List              LPN-List
    ...,
    pRSMutingConfiguration    PRSMutingConfiguration
}
LPN-List ::= SEQUENCE (SIZE (1..maxnoLPN)) OF LPN-Information-
Item
LPN-Information-Item :: CHOICE {
lPNIndex   LPNIndex,
lPNLocation  LPNLocation,
...,
}
```

Figure 17:
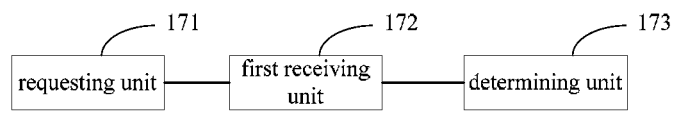
FIG. 17 is a schematic view showing a third structure of a positioning device for a user equipment provided by an embodiment of the disclosure.

Accordingly, refer to FIG. 17 which is a schematic view of the structure of a positioning device for a user equipment provided by an embodiment of the disclosure. The device includes a requesting unit 171, a first receiving unit 172 and a determining unit 173. The requesting unit 171 is configured to send a request for report of information on small nodes subordinate to an evolved base station eNB to the eNB. The first receiving unit 172 is configured to receive a response of the information on the small nodes subordinate to the eNB reported by the eNB, wherein the information on the small nodes subordinate to the eNB may be the indices of the small nodes under the eNB and the position of the small node corresponding to every index, but the disclosure is not limited thereto. The determining unit 173 is configured to determine a geographic position of a user equipment UE according to the information on the small nodes subordinate to the eNB.

Alternatively, the request sent by the requesting unit may further include request for report of the configuration information of the PRS, and accordingly, the response received by the first receiving unit may further include the configuration information of the PRS.

Alternatively, the device may further include a sending unit, a second receiving unit and a calculating unit. The sending unit is configured to send, after the first receiving unit receives the configuration information of the PRS, assistance data to the UE, the assistance data including the information on the small nodes subordinate to the eNB and the configuration information of the PRS, enabling the UE to estimate a positioning measurement of positioning reference signal according to the information on the small nodes subordinate to the eNB and the configuration information of the PRS. The second receiving unit is configured to receive the positioning measurement sent by the UE. The calculating unit is configured to calculate a geographic position of the UE according to the positioning measurement.

The process of estimating the positioning measurement according to the configuration information of the PRS in the embodiment is similar to the process of calculating the measurement of RSTD in the above embodiments, and the difference there between is in that the UE calculates the positioning measurement according to the PRS sent by the small nodes subordinate to the eNB.

Figure 18:
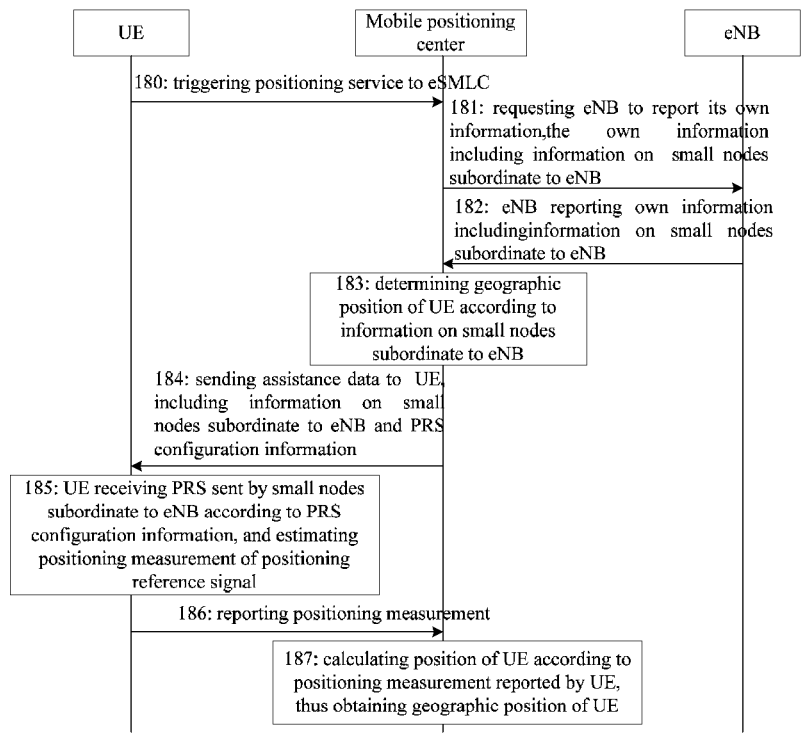
FIG. 18 is a flowchart showing a sixth application example of a positioning method for a user equipment provided by an embodiment of the disclosure.

Refer to FIG. 18 which is a flowchart showing the sixth application example of a positioning method for a user equipment provided by an embodiment of the disclosure. The method is described in detail as follows.

Step 180: triggering a positioning service to the mobile location center.

There is no limitation on the triggering source. The triggering source may be triggered when the UE itself needs to be positioned, or may be triggered when the network needs to position the UE, and the embodiment is exemplified by triggering by UE.

The mobile location center may be a location server, or eSMLC, etc.

Step 181: the mobile location center requesting the eNB to report its own information after receiving the triggering of the positioning service. The own information includes the information on the small nodes subordinate to the eNB. Furthermore, the own information may further include PRS configuration information and/or transmission antenna position of the eNB.

Step 182: the eNB sending its own information to the mobile location center. The own information includes the information on the small nodes subordinate to the eNB. Furthermore, the own information may further include the PRS configuration information and/or transmission antenna position of the eNB.

The embodiment is exemplified by the eNB having a plurality of subordinate small nodes, wherein the information on the small nodes includes the indices of the small nodes under the eNB (every eNB has a set of indices for the subordinate small nodes) and the position of the small node corresponding to every index. But the disclosure is not limited thereto and may have other information, and there is no limitation in the embodiment.

Step 183: the mobile location center, after receiving the information on the small nodes subordinate to the eNB, determining the geographic position of the UE according to the information on the small nodes subordinate to the eNB.

Further, after determining the geographic position of the UE, if the geographic position of the UE is not very accurate, the method may further includes the processes as follows.

Step 184: the mobile location center sending assistance data to the UE, where the assistance data includes the information on the small nodes subordinate to the eNB and the PRS configuration information, and furthermore, the assistance data may further include the information on the position of the transmission antenna.

Step 185: the UE receiving the PRS sent by the small nodes subordinate to the eNB according to the PRS configuration information, and estimating the positioning measurement of the positioning reference signal.

Step 186: the UE reporting the positioning measurement to the mobile location center.

Step 187: the mobile location center calculating the position of the UE according to the positioning measurement reported by the UE, thus obtaining the geographic position of the UE.

Alternatively, in the above embodiment, if the mobile location center has acquired the information on the small nodes subordinate to the eNB, the geographic position of the UE can be directly determined according to the information on the small nodes subordinate to the eNB, and the process may proceed to the subsequent step 183. Of course, if the geographic position of the UE determined at this time is deemed to be inaccurate, alternatively, step 183 to step 186 may be carried out, and there is no limitation in the embodiment.

Alternatively, in another embodiment, the mobile location center requests the eNB to report the information on the small nodes subordinate to the eNB and the PRS configuration information of the eNB. Of course, other information, such as the position of the transmission antenna etc. may be further included.

Step 182: the eNB sending the information on the small nodes subordinate to the eNB and the PRS configuration information of the eNB to the mobile location center, wherein of course, the position of the transmission antenna may be further included.

In the embodiments of the disclosure, the UE may be any one as follows, may be stationary or mobile, and the example of the stationary UE may include terminal (terminal), mobile station (mobile station), subscriber unit (subscriber unit) or station (station), etc. The example of the mobile UE may include cellular phone (cellular phone), personal digital assistant (PDA, personal digital assistant), wireless modem (modem), wireless communication device, handheld device (handheld), laptop computer (laptop computer), cordless phone (cordless phone) or wireless local loop (WLL, wireless local loop) station, etc. The UE may be distributed across the whole network.

The disclosure has been described by way of application examples in order to facilitate ones skilled in the art to understand the disclosure. It is to be noted that the mobile management network element may be any one of MME (Mobility Management Entity, mobility management entity) or SGSN (Serving GPRS Support Node, serving GPRS support node). For the sake of clarity, the application example is described by taking MME as the example of the mobile management network element.

It is to be noted that the term such as "first, second, and so on" used in the context is only used to distinguish one entity or operation from another entity or operation, and is not intended to the actual relationship or sequence between these entities or operations. Furthermore, the term "include", "comprise" or the other variation is intended to a inclusion in inclusive sense, but not in exclude sense, thus the process, method, object or equipment including elements will not only include these elements, but also include other elements which are not clearly listed, or further include the elements inherent to the process, method, object or equipment. Unless defined otherwise, the elements defined by the term "comprise a . . . " would not exclude the presence of other identical elements in the process, method, object or equipment including the stated elements.

From the description of the embodiment of the disclosure, ones skilled in the art would clearly understand that the disclosure can be achieved by software together with the necessary general-purpose hardware, and certainly can also be achieved only by hardware, but the former would be preferred. Based on this understanding, the solution of the disclosure naturally or the portion by which the disclosure contributes to the prior art can be implemented in the form of software products, and the software products can be stored in storage media, such as ROM/RAM, hard disks, compact disks and the like, containing several instructions capable of enabling a computer device (personal computer, server or network device, etc.) to execute the method described in the embodiments or part of the embodiments.

While the disclosure has been described by way of the preferred embodiments, it is to be noted that many modifications or variations can be made in the embodiments by ordinary ones skilled in the art without departing from the spirit of the disclosure as these modifications or variations should also fall within the protection scope of the disclosure.

What is claimed is:

1. A positioning method for a user equipment, after receiving a positioning service trigger, the method comprising:

acquiring, by a mobile location center, a velocity estimate of a user equipment (UE) to be positioned;

selecting, by the mobile location center, configuration information of a positioning reference signal (PRS) according to the velocity estimate, setting a PRS sending period of an evolved base station (eNB) according to the configuration information, and sending the PRS sending period to the eNB, wherein the configuration information includes a transmission time of the PRS;

sending, by the mobile location center, the configuration information of the PRS to the UE, enabling the UE to receive the PRS sent by the eNB according to the configuration of the PRS and estimate a measurement of reference signal time difference (RSTD); and receiving, by the mobile location center, the measurement of RSTD sent by the UE, and calculating a geographic position of the UE according to the measurement of RSTD.

2. The method according to claim 1, wherein acquiring the velocity estimate of the UE comprises obtaining the velocity estimate of the UE from a request received from the UE for assistance data of the PRS.

3. The method according to claim 1, wherein acquiring the velocity estimate of the UE comprises requesting the eNB to report the velocity estimate for positioning the UE.

4. The method according to claim 2, wherein the obtaining the velocity estimate of the UE from the request received from the UE for assistance data of the PRS comprises:

requesting, when receiving the positioning service trigger, the UE to report the measurement of RSTD of the PRS through a long-term evolution positioning protocol (LPP) signaling; and receiving the request for the assistance data of the configuration information of the PRS through the LPP signaling which is sent by the UE after receiving the request for the measurement of RSTD of the PRS, the LPP signaling comprising the velocity estimate of the UE.

5. The method according to claim 3, wherein the requesting the eNB to report the velocity estimate for positioning the UE comprises:

requesting, when receiving the positioning service trigger, the user equipment UE to report the measurement of RSTD of the PRS through the a long-term evolution positioning protocol (LPP) signaling;

receiving a request for the assistance data of the PRS through the LPP signaling which is sent by the UE after receiving the request for the measurement of RSTD of the PRS;

requesting the eNB to report the velocity estimate of the UE through a long-term evolution positioning protocol (LPPa) signaling; and receiving an LPPa signaling response sent by the eNB, the LPPa signaling response comprising an identification for the UE to be positioned and the velocity estimate of the UE.

6. The method according to claim 1, wherein the velocity estimate comprises an exact velocity value or a velocity level.

7. A data sending method, comprising:

receiving, by a user equipment (UE), a request for reporting a measurement of reference signal time difference (RSTD) of a positioning reference signal (PRS) sent by a mobile location center;

sending, by the UE after receiving the request for reporting the measurement of RSTD of the PRS sent by the mobile location center, to the mobile location center a request for assistance data of PRS configuration information, the request comprising a velocity estimate of the UE, and the PRS configuration information includes a transmission time of the PRS;

receiving, by the UE, the assistance data sent by the mobile location center, the assistance data comprising the PRS configuration information of an evolved base station (eNB);

receiving, by the UE, the PRS according to the PRS configuration information of the eNB, and estimating the measurement of RSTD wherein the transmission time of the PRS is set according to the PRS configuration information; and sending, by the UE, the measurement of RSTD to the mobile location center, enabling the mobile location center to calculate a geographic position of the UE.

8. A positioning method for a user equipment, comprising:

acquiring, by a mobile location center, configuration information of a positioning reference signal (PRS) of an evolved base station (eNB) and acquiring a velocity estimate of a user equipment (UE);

sending, by the mobile location center, the configuration information of the PRS to the UE, enabling the UE to receive the PRS according to the configuration information of the PRS and estimate a measurement of reference signal time difference (RSTD);

receiving, by the mobile location center, the measurement of RSTD sent by the UE; and calculating, by a mobile location center, a geographic position of the UE according to the measurement of RSTD, and performing compensation for the geographic position according to the velocity estimate.

9. The method according to claim 8, wherein acquiring configuration information of the PRS of the eNB and acquiring the velocity estimate of the UE comprises:

requesting the eNB to report the velocity estimate of the UE, an identification of the UE and the configuration information of the PRS through a long-term evolution positioning protocol (LPPa) signaling; and receiving an LPPa signaling response sent by the eNB, the LPPa signaling comprising the identification of the UE, the velocity estimate of the UE and the configuration information of the PRS.

10. A data sending method, comprising:

requesting by a user equipment (UE), when receiving a request sent by a mobile location center for reporting a measurement of reference signal time difference (RSTD) of a positioning reference signal (PRS), the mobile location center for assistance data of configuration information of the PRS;

receiving, by the UE, the assistance data of the PRS sent by the mobile location center, the assistance data comprising the configuration information of the PRS of an evolved base station (eNB);

receiving, by the UE, the PRS according to the configuration information of the PRS of the eNB and estimating the measurement of RSTD; and sending, by the UE, the measurement of RSTD to the mobile location center, enabling the mobile location center to calculate a geographic position of the UE and perform compensation for the geographic position according to the acquired velocity estimate of the UE.

11. A positioning method for a user equipment (UE), comprising:
   acquiring, by a mobile location center, configuration information of a positioning reference signal (PRS) of an evolved base station (eNB) and acquiring a PRS time difference between different nodes under the eNB;
   sending, by the mobile location center, the configuration information of the PRS, an identification of the eNB, identifications of the different nodes, and the PRS time difference between the different nodes, enabling the UE to receive the PRS according to the configuration information of the PRS, perform time domain compensation according to the PRS time difference between the different nodes, and estimate a measurement of reference signal time difference (RSTD);
   receiving, by the mobile location center, the measurement of RSTD sent by the UE; and
   calculating, by the mobile location center, a geographic position of the UE according to the measurement of RSTD.

12. The method according to claim 11, wherein acquiring configuration information of the PRS of the eNB and acquiring the PRS time difference between all the different nodes under the eNB comprises:
   requesting the eNB to report the PRS time difference between all the different nodes, the identifications of the different nodes and the configuration information of the PRS through a long-term evolution positioning protocol (LPPa) signaling; and
   receiving an LPPa signaling response sent by the eNB, the LPPa signaling response comprising the PRS time difference between all the different nodes, the identifications of all the different nodes, and the configuration information of the PRS.

13. The method according to claim 11, wherein the PRS time difference between all the different nodes comprises PRS sending time difference between all the different component carriers (CC) or PRS time difference between all the different coordinated multi-point transmission (CoMP) nodes.

14. The method according to claim 11, wherein the time difference comprises an exact time difference or level.

15. A data sending method, comprising:
   requesting by a user equipment (UE), when receiving a request sent by a mobile location center for reporting a measurement of reference signal time difference (RSTD) of a positioning reference signal (PRS), the mobile location center for assistance data of configuration information of the PRS;
   receiving, by the UE, the configuration information of the PRS of an evolved base station (eNB) sent by the mobile location center, and a PRS time difference between different nodes under the eNB;
   receiving, by the UE, the PRS according to the configuration information of the PRS of the eNB, performing time domain compensation according to the PRS time difference between the different nodes, and estimating the measurement of RSTD; and
   sending, by the UE, the measurement of RSTD to the mobile location center, enabling the mobile location center to calculate a geographic position of the UE.

16. The method according to claim 15, wherein receiving the configuration information of the PRS of the eNB sent by the mobile location center, and a PRS time difference between all the different nodes under the eNB comprises:
   receiving the configuration information of the PRS and the PRS time difference between all the different nodes under the eNB sent by the mobile location center through a long-term evolution positioning protocol (LPPa) signaling, the LPPa signaling further comprising an identification of the eNB and identifications of the different nodes.

17. The method according to claim 15, wherein the PRS time difference between all the different nodes comprises:
   PRS sending time difference between all the different component carriers (CC), or PRS time difference between all the different coordinated multi-point transmission (CoMP) nodes under the eNB.

18. A positioning device for a user equipment, wherein after receiving a positioning service trigger, the device comprises:
   an acquiring unit configured to acquire a velocity estimate of a user equipment (UE) to be positioned;
   a determining unit configured to select configuration information of a positioning reference signal (PRS) according to the velocity estimate, and set a PRS sending period of an evolved base station (eNB) according to the configuration information, wherein the configuration information includes a transmission time of the PRS;
   a first sending unit configured to send the PRS sending period to the eNB;
   a second sending unit configured to send the configuration information of the PRS to the UE, enabling the UE to receive the PRS sent by the eNB according to the configuration information of the PRS and estimate a measurement of reference signal time difference (RSTD);
   a receiving unit configured to receive the measurement of RSTD sent by the UE; and
   a calculating unit configured to calculate a geographic position of the UE according to the measurement of RSTD.

19. The device according to claim 18, wherein the acquiring unit comprises a first acquiring unit configured to obtain the velocity estimate of the UE from a request received from the UE for assistance data of the PRS.

20. The device according to claim 19, wherein the first acquiring unit comprises:
   a first requesting unit configured to request, when the positioning service trigger is received, the UE to report the measurement of RSTD of the PRS through a long-term evolution positioning protocol (LPP) signaling; and
   a first obtaining unit configured to receive the request for the assistance data of the configuration information of the PRS through the LPP signaling which is sent by the UE after receiving the request for the measurement of RSTD of the PRS, the LPP signaling comprising the velocity estimate of the UE.

21. The device according to claim 18, wherein the acquiring unit comprises a second acquiring unit configured to request the eNB to report the velocity estimate for positioning the UE.

22. The device according to claim 21, wherein the second acquiring unit comprises:
   a second requesting unit configured to request, when the positioning service trigger is received, the user equipment UE to report the measurement of RSTD of the PRS through the a long-term evolution positioning protocol (LPP) signaling;

a second obtaining unit configured to receive a request for the assistance data of the PRS through the LPP signaling which is sent by the UE after receiving the request for the measurement of RSTD of the PRS;

a third requesting unit configured to request the eNB to report the velocity estimate of the UE through a long-term evolution positioning protocol (LPPa) signaling; and a third obtaining unit configured to receive an LPPa signaling response sent by the eNB, the LPPa signaling response comprising an identification for the UE to be positioned and the velocity estimate of the UE.

23. A user equipment (UE), comprising:

a first receiving unit configured to receive a request for reporting measurement of reference signal time difference (RSTD) of a positioning reference signal (PRS) sent by a mobile location center;

a first sending unit configured to send to the mobile location center a request for assistance data of PRS configuration information when the first receiving unit receives the request, the request comprising a velocity estimate of the UE;

a second receiving unit configured to receive the assistance data sent by the mobile location center, the assistance data comprising the PRS configuration information of an evolved station (eNB);

an estimating unit configured to receive the PRS according to the PRS configuration information of the eNB and estimating the measurement of reference signal time difference RSTD; and a second sending unit configured to send the measurement of RSTD to the mobile location center, enabling the mobile location center to calculate a geographic position of the UE.

24. A positioning device for a user equipment, comprising:

an acquiring unit configured to acquire configuration information of a positioning reference signal (PRS) of an evolved base station (eNB) and acquire a velocity estimate of a user equipment (UE);

a sending unit configured to send the configuration information of the PRS to the UE, enabling the UE to receive the PRS according to the configuration information of the PRS and estimate a measurement of reference signal time difference (RSTD);

a receiving unit configured to receive the measurement of RSTD sent by the UE; and a calculating unit configured to calculate a geographic position of the UE according to the measurement of RSTD and performing compensation for the geographic position according to the velocity estimate.

25. The device according to claim 24, wherein the acquiring unit comprises:

a requesting unit configured to request the eNB to report the velocity estimate of the UE, an identification of the UE and the configuration information of the PRS through a long-term evolution positioning protocol (LPPa) signaling; and an obtaining unit configured to receive an (LPPa) signaling response sent by the eNB, the LPPa signaling response comprising the identification of the UE, the velocity estimate of the UE and the configuration information of the PRS.

26. A positioning device for a user equipment (UE), comprising:

an acquiring unit configured to acquire configuration information of a positioning reference signal (PRS) of an evolved base station (eNB) and acquire a PRS time difference between different nodes under the eNB;

a sending unit configured to send the configuration information of the PRS, an identification of the eNB, identifications of the different nodes, and the PRS time difference between the different nodes, enabling the UE to receive the PRS according to the configuration information of the PRS, perform time domain compensation according to the PRS time difference between the different nodes, and estimate a measurement of reference signal time difference (RSTD);

a receiving unit configured to receive the measurement of RSTD sent by the UE; and a calculating unit configured to calculate a geographic position of the UE according to the measurement of RSTD.

27. The device according to claim 26, wherein the acquiring unit comprises:

a requesting unit configured to request the eNB to report the PRS time difference between all the different nodes, the identifications of the different nodes and the PRS configuration information through a long-term evolution positioning protocol (LPPa) signaling; and an obtaining unit configured to receive an LPPa signaling response sent by the eNB, the LPPa signaling response comprising the PRS time difference between all the different nodes, the identifications of the different nodes, and the configuration information of the PRS.

28. The device according to claim 26, wherein the PRS time difference between all the different nodes obtained by the obtaining unit comprises PRS sending time difference between all the different component carriers (CC) or PRS time difference between all the different coordinated multi-point transmission (CoMP) nodes.

29. A user equipment (UE), comprising:

a first receiving unit configured to receive a request sent by a mobile location center for reporting a measurement of reference signal time difference (RSTD) of a positioning reference signal (PRS);

a first sending unit configured to request the mobile location center for assistance data of configuration information of the PRS when the first receiving unit receives the request;

a second receiving unit configured to receive the configuration information of the PRS of an evolved base station (eNB) sent by the mobile location center, and a PRS time difference between different nodes under the eNB;

an estimating unit configured to receive the PRS according to the configuration information of the PRS of the eNB, performing time domain compensation according to the PRS time difference between the different nodes, and estimate the measurement of RSTD; and a second sending unit configured to send the measurement of RSTD to the mobile location center, enabling the mobile location center to calculate a geographic position of the UE.

30. The device according to claim 29, wherein the second receiving unit is configured to: receive the configuration information of the PRS and the PRS time difference between all the different nodes under the eNB sent by the mobile location center through a long-term evolution positioning protocol (LPPa) signaling, the LPPa signaling further comprising an identification of the eNB and identifications of the different nodes, wherein the PRS time difference between all the different nodes comprises PRS sending time difference between all the different component carriers (CC), or PRS time difference between all the different coordinated multi-point transmission (CoMP) nodes under the eNB.

31. A positioning method for a user equipment, comprising:
 sending a request for report of information on small nodes subordinate to an evolved base station (eNB) to the eNB;
 receiving a response of the information on the small nodes subordinate to the eNB reported by the eNB; and
 determining a geographic position of a user equipment (UE) according to the information on the small nodes subordinate to the eNB, wherein:
 the request is further for reporting configuration information of a positioning reference signal (PRS); and
 the response further comprises the configuration information of the PRS,
 wherein after receiving the configuration information of the PRS sent by the eNB, the method further comprises:
 sending assistance data to the UE, the assistance data comprising the information on the small nodes subordinate to the eNB and the configuration information of the PRS, enabling the UE to estimate a positioning measurement of the PRS according to the information on the small nodes subordinate to the eNB and the configuration information of the PRS;
 receiving the positioning measurement sent by the UE; and
 calculating the geographic position of the UE according to the positioning measurement.

32. The method according to claim 31, wherein the information on the small nodes subordinate to the eNB comprises indices of the small nodes under the eNB and position of a small node corresponding to each index.

33. A positioning device for a user equipment, comprising:
 send a request for report of information on small nodes subordinate to an evolved base station (eNB) to the eNB;
 receive a response of the information on the small nodes subordinate to the eNB reported by the eNB; and
 determine a geographic position of a user equipment (UE) according to the information on the small nodes subordinate to the eNB,
 wherein the request sent by the requesting unit is further configured to report configuration information of a positioning reference signal (PRS), and the response received by the first receiving unit further comprises the configuration information of the PRS,
 and the device further comprises:
 a sending unit configured to send, after the first receiving unit receives the configuration information of the PRS, assistance data to the UE, the assistance data comprising the information on the small nodes subordinate to the eNB and the configuration information of the PRS, enabling the UE to estimate a positioning measurement of the PRS according to the information on the small nodes subordinate to the eNB and the configuration information of the PRS;
 a second receiving unit configured to receive the positioning measurement sent by the UE; and
 a calculating unit configured to calculate a geographic position of the UE according to the positioning measurement.

* * * * *